(12) United States Patent
Ohara

(10) Patent No.: US 12,295,040 B2
(45) Date of Patent: May 6, 2025

(54) TERMINAL AND COMMUNICATION METHOD

(71) Applicant: NTT DOCOMO, INC., Tokyo (JP)

(72) Inventor: Tomoya Ohara, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 341 days.

(21) Appl. No.: 17/799,155

(22) PCT Filed: Feb. 24, 2021

(86) PCT No.: PCT/JP2021/006803
§ 371 (c)(1),
(2) Date: Aug. 11, 2022

(87) PCT Pub. No.: WO2021/172338
PCT Pub. Date: Sep. 2, 2021

(65) Prior Publication Data
US 2023/0072931 A1   Mar. 9, 2023

(30) Foreign Application Priority Data
Feb. 26, 2020 (JP) .................................. 2020-030145

(51) Int. Cl.
*H04W 74/08*   (2024.01)
*H04W 74/0833*   (2024.01)

(52) U.S. Cl.
CPC .............................. *H04W 74/0833* (2013.01)

(58) Field of Classification Search
CPC ............ H04W 74/006; H04W 74/0833; H04L 27/26025; H04L 5/0044; Y02D 30/70
See application file for complete search history.

(56) References Cited

U.S. PATENT DOCUMENTS

| | | | |
|---|---|---|---|
| 2022/0061101 A1* | 2/2022 | Wu | H04L 5/0053 |
| 2022/0104267 A1* | 3/2022 | Gao | H04W 74/0833 |
| 2023/0131118 A1* | 4/2023 | Kim | H04W 52/0216 |
| | | | 370/311 |
| 2024/0080904 A1* | 3/2024 | Agiwal | H04W 72/23 |

FOREIGN PATENT DOCUMENTS

| | | |
|---|---|---|
| EP | 3954174 | 2/2022 |
| WO | 2020/222481 A1 | 11/2020 |

OTHER PUBLICATIONS

Extended European Search Report issued in counterpart European Patent Application No. 21761437.9, mailed on Feb. 23, 2024 (16 pages).

(Continued)

*Primary Examiner* — Awet Haile
(74) *Attorney, Agent, or Firm* — Osha Bergman Watanabe & Burton LLP

(57) ABSTRACT

A terminal includes a receiving unit that receives, from a base station, a parameter for a random access procedure; a control unit that determines a time domain location of the PUSCH slot based on a time domain location of a Physical Random Access Channel (RACH) slot, subcarrier spacing of the RACH slot, subcarrier spacing of a Physical Uplink Shared Channel (PUSCH) slot, and the parameter; and a transmitting unit that transmits, at the determined time domain location, the PUSCH to the base station.

4 Claims, 17 Drawing Sheets

(56) References Cited

OTHER PUBLICATIONS

Samsung; "Channel Structure for Two-Step RACH"; 3GPP TSG RAN WG1 Meeting #100e, R1-2000605; e-Meeting; Feb. 24-Mar. 6, 2020 (3 pages).
ZTE; "FL summary #2 on the maintenance of 2-step RACH channel structure"; 3GPP TSG-RAN WG1 Meeting #100, R1-2001206; e-meeting; Feb. 24-Mar. 6, 2020 (24 pages).
International Search Report issued in PCT/JP2021/006803 on May 25, 2021 (4 pages).
Written Opinion of the International Searching Authority issued in PCT/JP2021/006803 on May 25, 2021 (4 pages).
Nokia, Nokia Shanghai Bell; "On 2-step RACH Channel Structure"; 3GPP TSG RAN WG1 #97, R1-1906746; Reno, USA; May 13-17, 2019 (16 pages).
3GPP TS 38.300 V15.8.0; "3rd Generation Partnership Project; Technical Specification Group Radio Access Network; NR; NR and NG-RAN Overall Description; Stage 2 (Release 15)"; Dec. 2019 (99 pages).
3GPP TS 38.321 V15.8.0; "3rd Generation Partnership Project; Technical Specification Group Radio Access Network; NR; Medium Access Control(MAC) protocol specification (Release 15)"; Dec. 2019 (78 pages).

\* cited by examiner

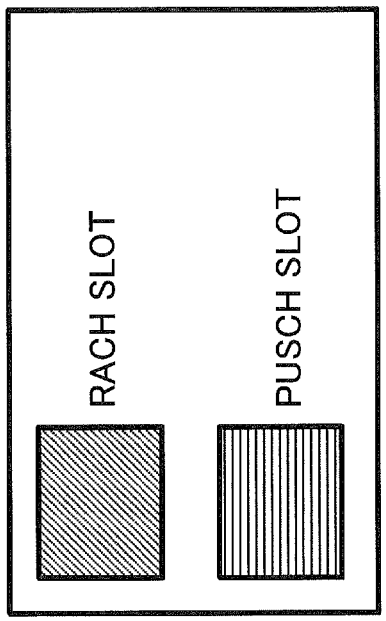
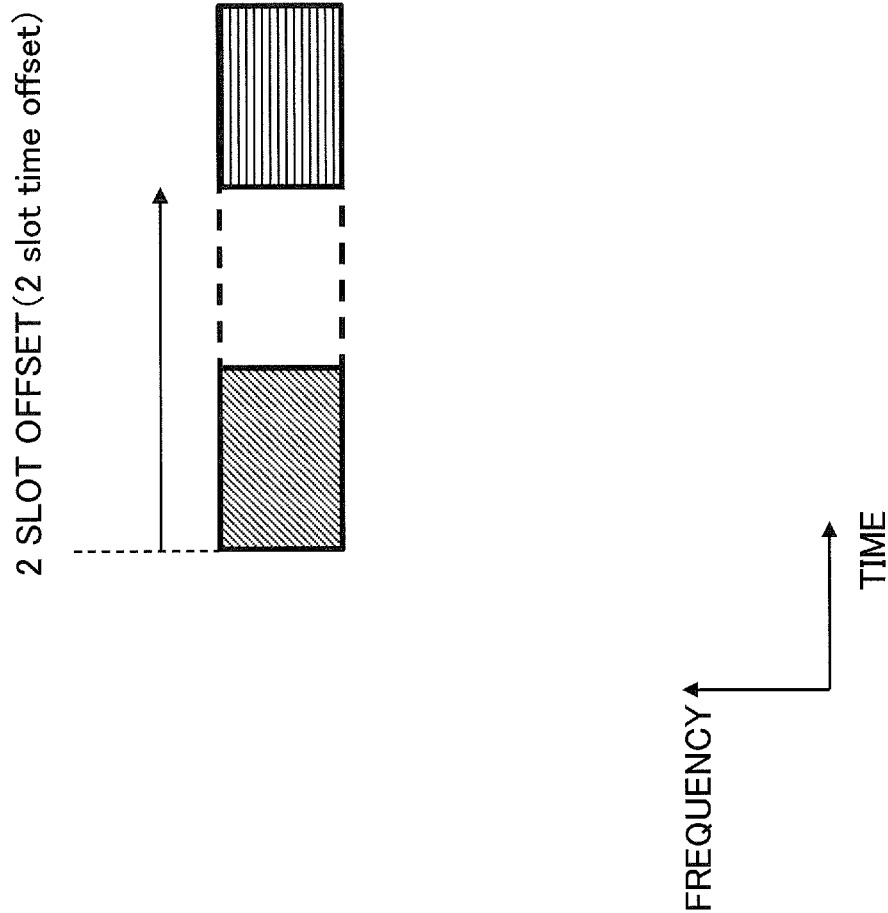
FIG.7

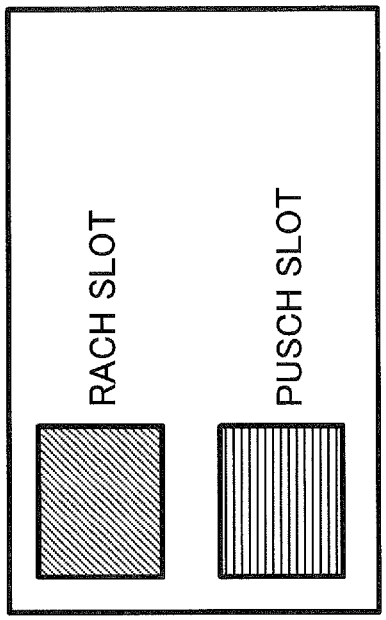
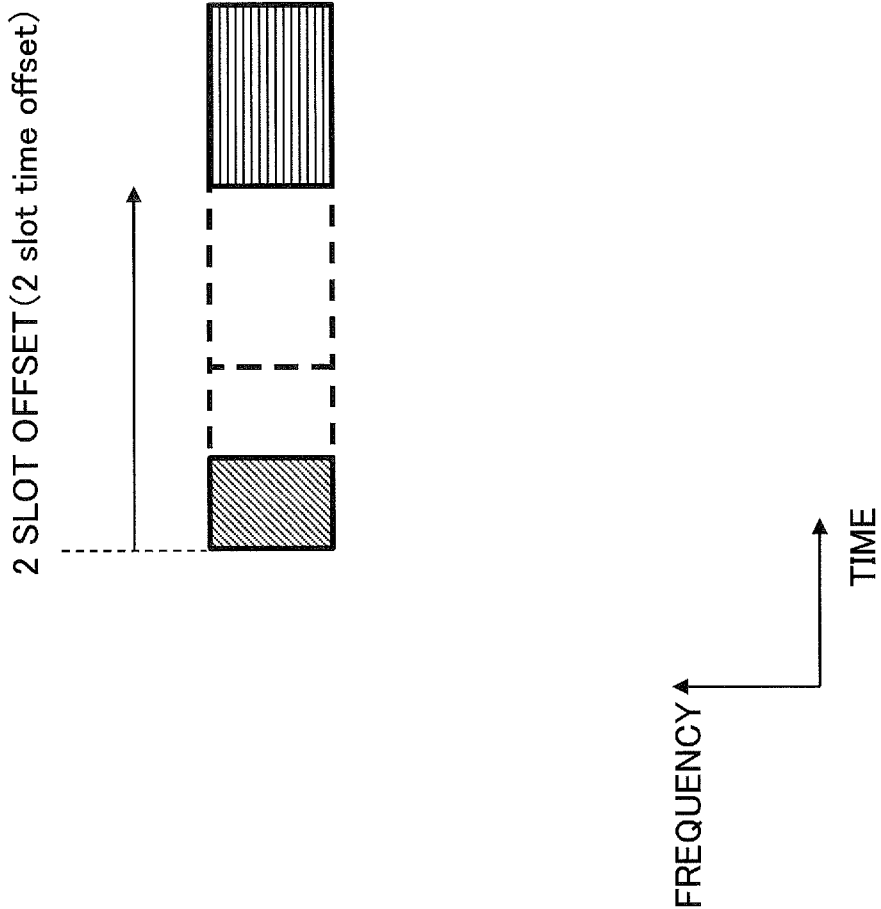
FIG.8

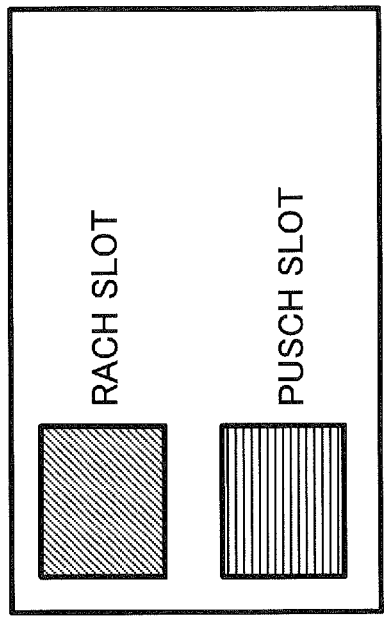
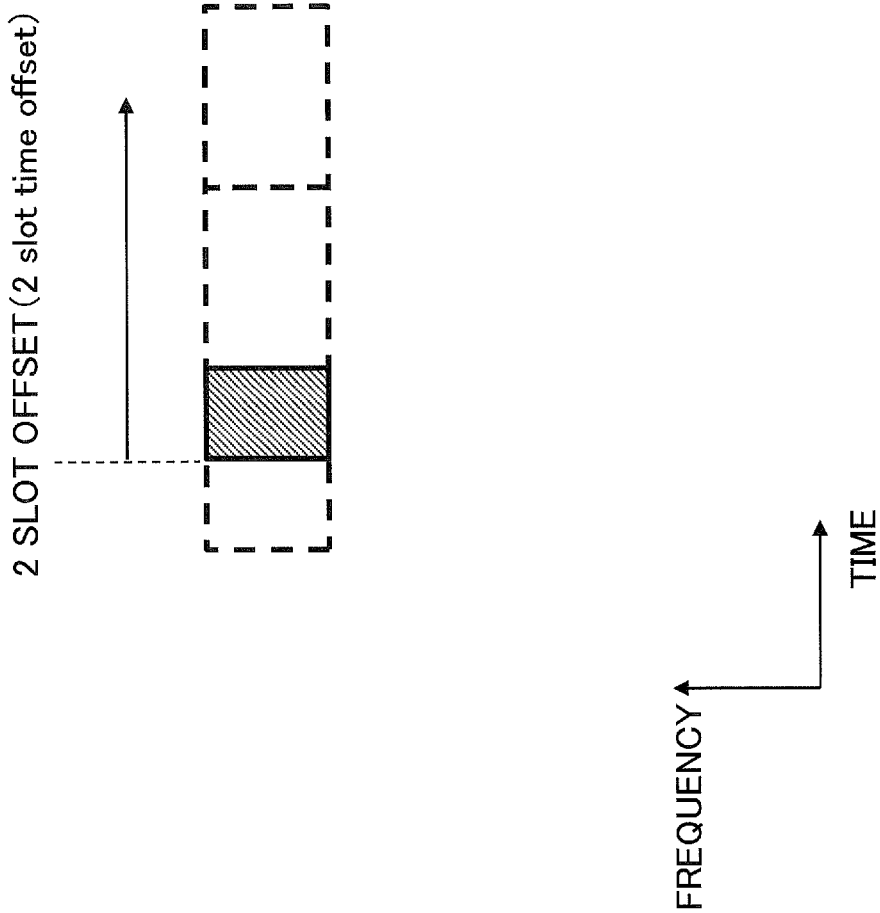
FIG.9

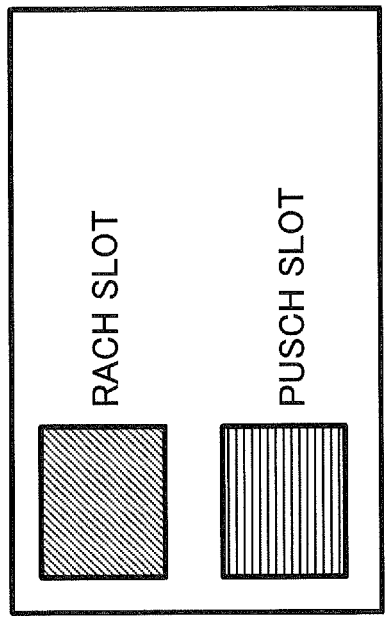
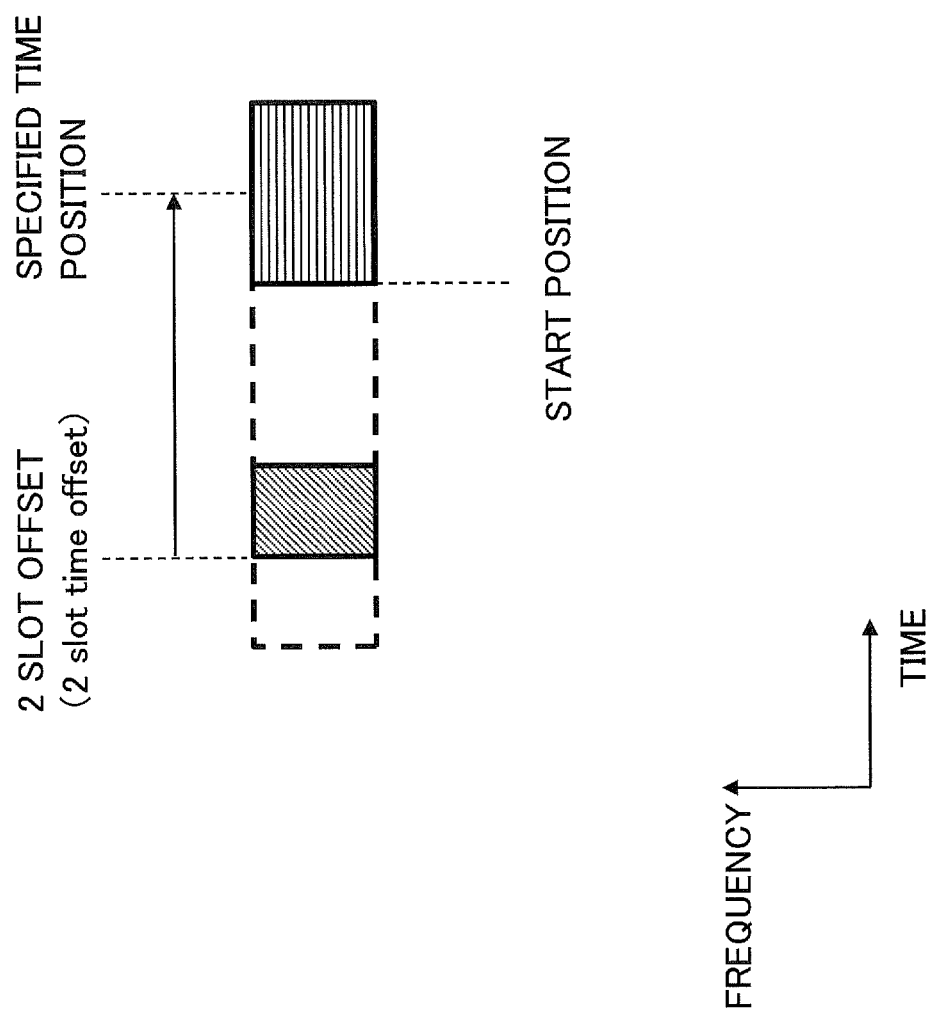
FIG.10

FIG.12
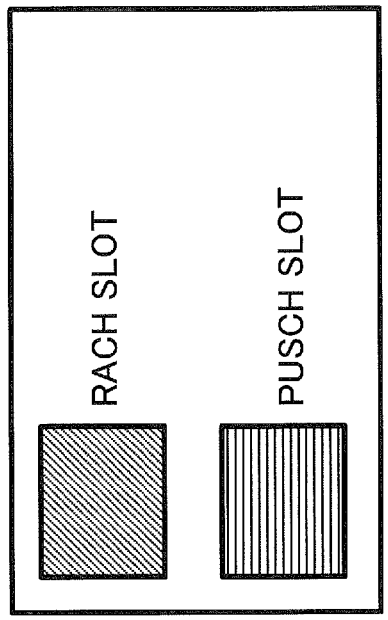
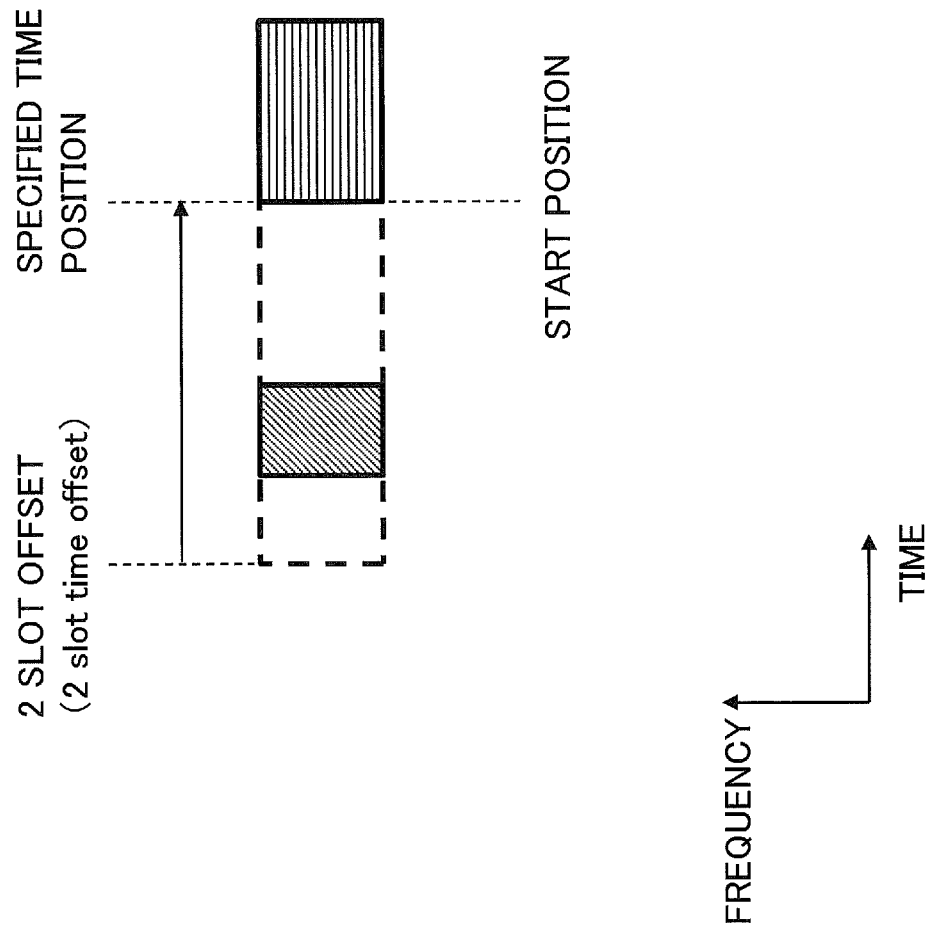

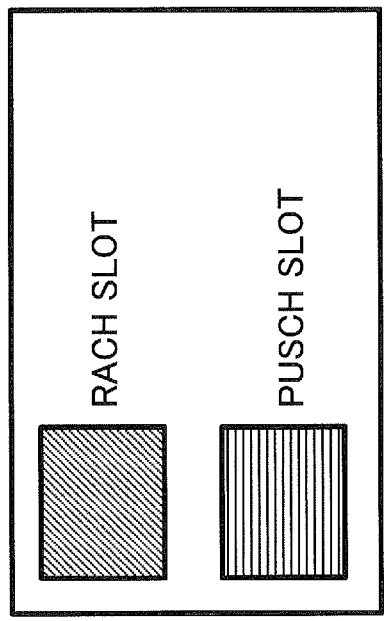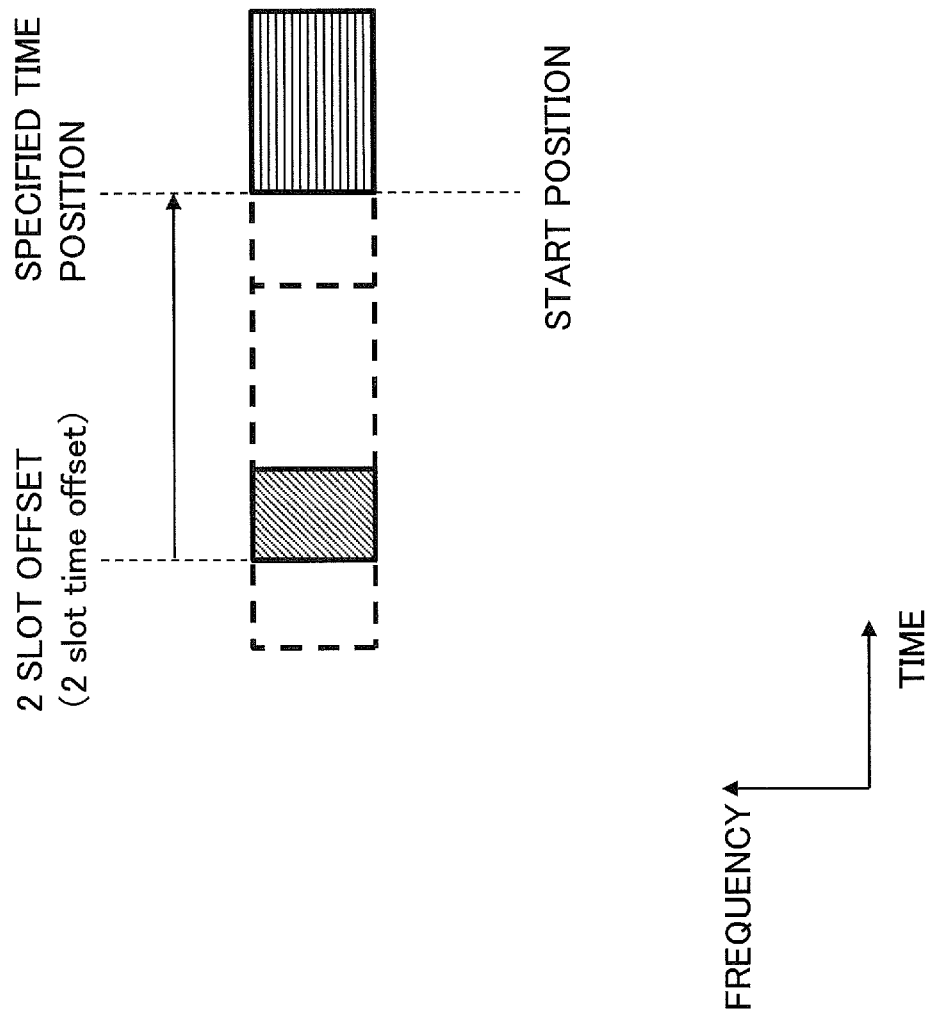
FIG.14

FIG.15
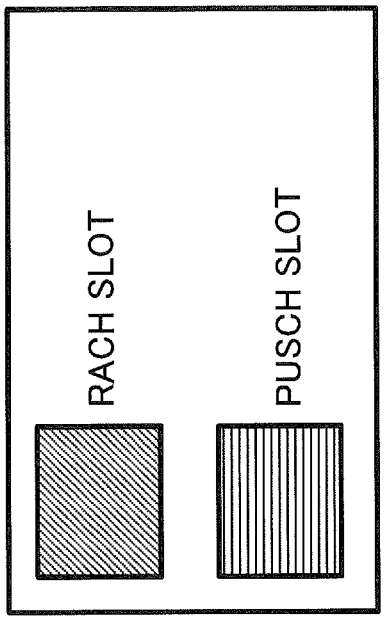
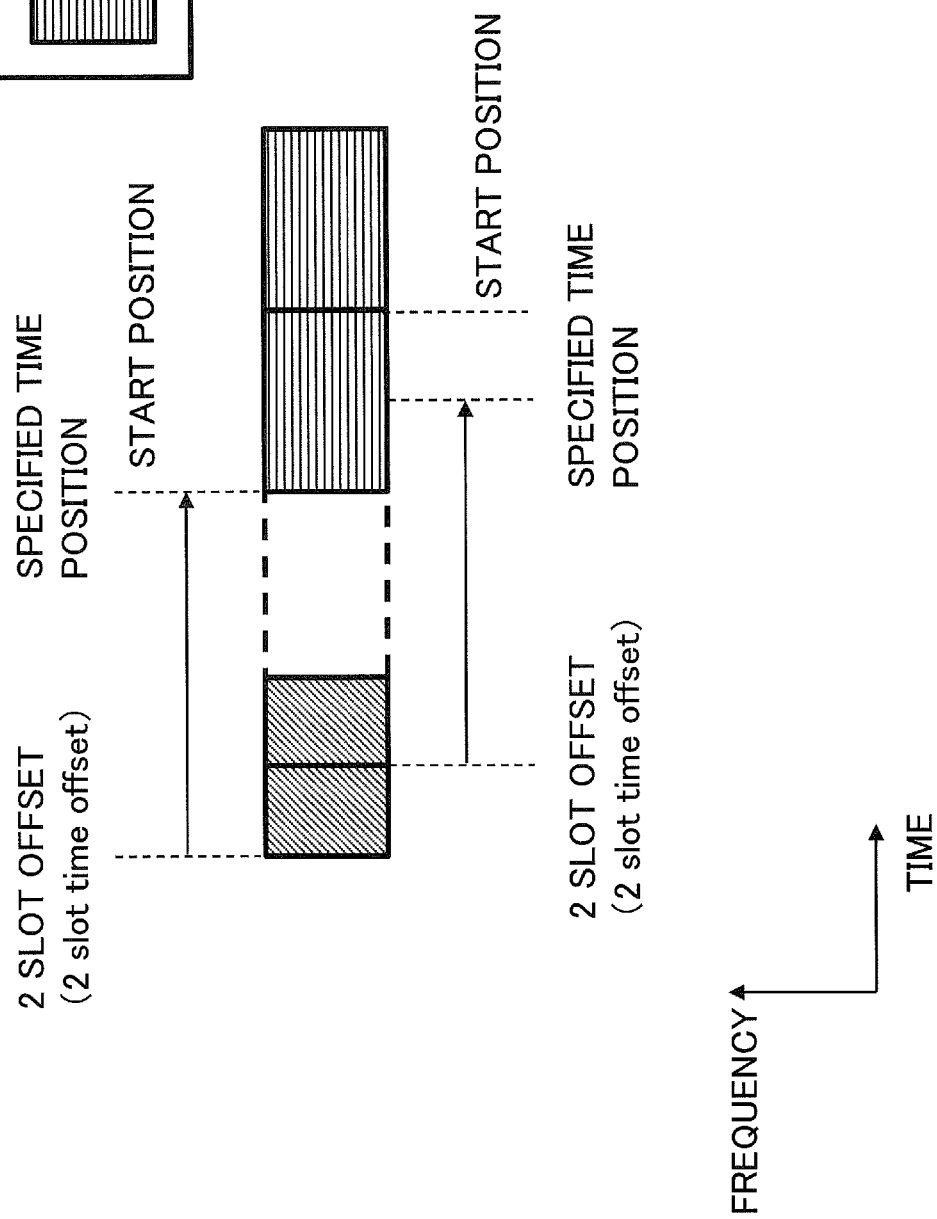

TERMINAL AND COMMUNICATION METHOD

TECHNICAL FIELD

The present invention relates to a terminal and a communication method in a radio communication system.

BACKGROUND ART

In New Radio (NR) (which is also referred to as "5G") that is a successor system to Long Term Evolution (LTE), technology has been studied that meets the requirements, such as a requirement on large capacity system, a requirement on a high data transmission rate, a requirement on low latency, a requirement on simultaneous connection of multiple terminals, a requirement on low cost, a requirement on power saving, and the like (e.g., Non-Patent Document 1). 5G is a mobile communication system that supports a high frequency band, such as millimeter waves over 10 GHz. Ultra-high-speed wireless data communications of several Gbps class can be achieved using a frequency bandwidth of several hundred MHz class, which is dramatically wider than that of a system according to related art, such as LTE.

Similar to LTE, in NR, a random access is executed for establishing synchronization between a terminal and a base station, or for a scheduling request. There are two types of a random access procedure, which are a contention based random access (CBRA: Contention based random access) and a contention free random access (CFRA: Contention free random access) (for example, Non-Patent Document 2).

RELATED ART DOCUMENT

Non-Patent Document

Non-Patent Document 1: 3GPP TS 38.300 V15.8.0 (2019 December)
Non-Patent Document 2: 3GPP TS 38.321 V15.8.0 (2019 December)

SUMMARY OF THE INVENTION

Problems to be Solved by the Invention

For a contention free random access procedure in an NR radio communication system, in addition to a usual 4-step random access procedure, a 2-step random access procedure has been studied in which a MsgA and a MsgB are used. In a 2-step random access procedure, a time domain location of a Physical Uplink Shared Channel occasion (PUSCH occasion) for a MsgA is signaled by a time offset from a start position of a Physical Random Access Channel occasion (PRACH occasion) for the MsgA. However, when subcarrier spacing of a PUSCH occasion for a MsgA differs from subcarrier spacing of a PRACH occasion for the MsgA, a case exists in which a start position of the PUSCH occasion for the MsgA is unable to be identified.

The present invention has been accomplished in view of the above-described point, and an object is to determine a time domain location of a transmission occasion during a random access procedure in a radio communication system.

Means for Solving the Problem

According to the disclosed technology, there is provided a terminal including a receiving unit that receives, from a base station, a parameter for a random access procedure; a control unit that determines a time domain location of the PUSCH slot based on a time domain location of a Physical Random Access Channel (RACH) slot, subcarrier spacing of the RACH slot, subcarrier spacing of a Physical Uplink Shared Channel (PUSCH) slot, and the parameter; and a transmitting unit that transmits, to the base station, the PUSCH at the determined time domain location.

Advantage of the Invention

According to the disclosed technology, in a radio communication system, a time domain location of a transmission occasion can be determined during a random access procedure.

BRIEF DESCRIPTION OF DRAWINGS

FIG. 7 is a diagram illustrating an example (2) of a transmission occasion for a random access.

FIG. 8 is a diagram illustrating an example (3) of a transmission occasion for a random access.

FIG. 9 is a diagram illustrating an example (4) of a transmission occasion for a random access.

FIG. 10 is a diagram illustrating an example (1) of a transmission occasion for a random access in an embodiment of the present invention.

FIG. 12 is a diagram illustrating an example (3) of a transmission occasion for a random access in an embodiment of the present invention.

FIG. 14 is a diagram illustrating an example (5) of a transmission occasion for a random access in an embodiment of the present invention.

FIG. 15 is a diagram illustrating an example (6) of a transmission occasion for a random access in an embodiment of the present invention.

EMBODIMENTS OF THE INVENTION

Figure 1:
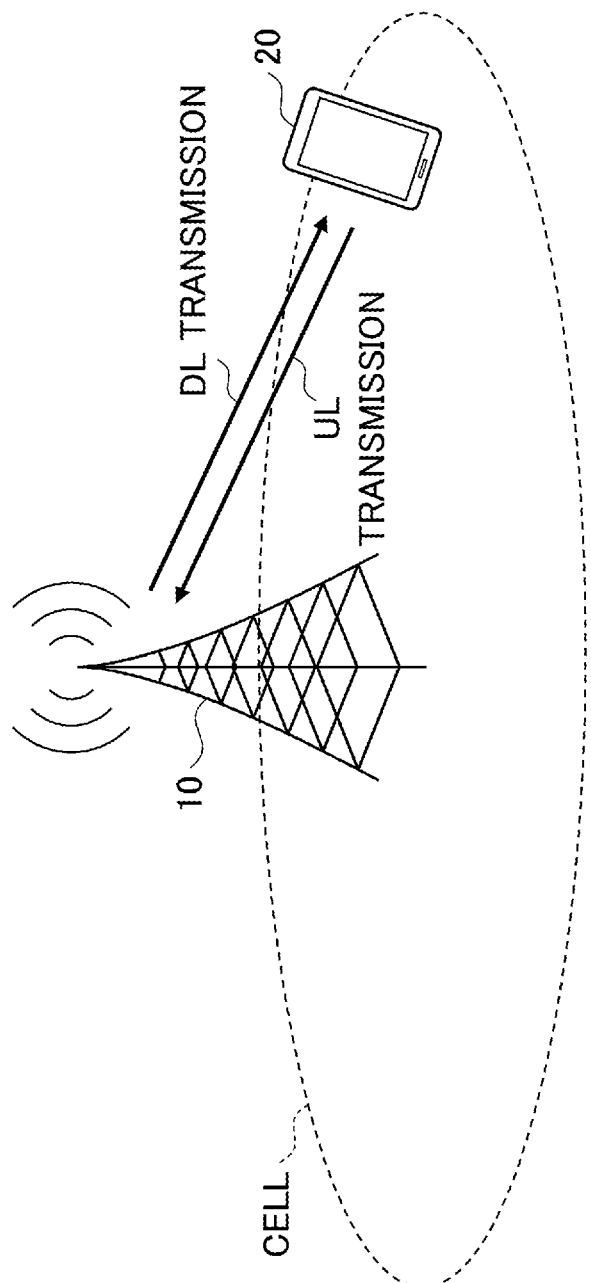
FIG. 1 is a diagram illustrating an example (1) of a configuration of a radio communication system in an embodiment of the present invention.

In the following, embodiments of the present invention are described by referring to the drawings. Note that the embodiments described below are an example, and embodiments to which the present invention is applied are not limited to the following embodiments.

In an operation of a radio communication system of an embodiment of the present invention, existing technology is appropriately used. Here, the existing technology is, for example, existing LTE but not limited to the existing LTE. Furthermore, the term "LTE" used in this specification has a broad meaning including LTE-Advanced and a system subsequent to LTE-Advanced (for example, NR), unless as otherwise specified.

In the embodiments of the present invention described below, terms used in the existing LTE are used, such as Synchronization signal (SS), Primary SS (PSS), Secondary SS (SSS), Physical broadcast channel (PBCH), Physical random access channel (PRACH), Physical Downlink Control Channel (PDCCH), Physical Downlink Shared Channel (PDSCH), Physical Uplink Control Channel (PUCCH), Physical Uplink Shared Channel (PUSCH), and the like. This is for convenience of description, and signals, functions, and the like, similar to these may be referred to by other names. The above-described terms in NR correspond to NR-SS, NR-PSS, NR-SSS, NR-PBCH, NR-PRACH, NR-PDCCH, NR-PDSCH, NR-PUCCH, NR-PUSCH and the like. However, even if a signal is used for NR, the signal is not always specified as "NR-."

In the embodiments of the present invention, a duplex method may be a Time Division Duplex (TDD) method, an Frequency Division Duplex (FDD) method, or any other method (e.g., Flexible Duplex).

In the embodiments of the present invention, "configuring" a radio parameter, or the like, may be "pre-configuring" a predetermined value, or configuring a radio parameter transmitted from a base station 10 or a terminal 20.

FIG. 1 is a diagram illustrating an example (1) of a configuration of a radio communication system according to an embodiment of the present invention. As illustrated in FIG. 1, a base station 10 and a terminal 20 are included. In FIG. 1, one base station 10 and one terminal 20 are illustrated. However, this is an example, and there may be a plurality of base stations 10 and a plurality of terminals 20. Note that the terminal 20 may be referred to as "user equipment." Furthermore, a radio communication system in the embodiments may be referred to as an NR-U system.

The base station 10 provides one or more cells, and the base station 10 is a communication device for performing radio communication with the terminal 20. A physical resource of a radio signal may be defined in a time domain and a frequency domain, the time domain may be defined in terms of a slot or a number of OFDM symbols, and the frequency domain may be defined in terms of a sub-band, a sub-carrier, or a resource block.

As illustrated in FIG. 1, the base station 10 transmits control information or data to the terminal 20 on Downlink (DL), and the base station 10 receives control information or data from the terminal 20 on Uplink (UL). Each of the base station 10 and the terminal 20 can transmit and receive signals by performing beamforming. Furthermore, the base station 10 and the terminal 20 can apply Multiple Input Multiple Output (MIMO) based communication to DL or UL. Furthermore, the base station 10 and the terminal 20 may perform communication through a Secondary Cell (SCell) and a Primary Cell (PCell) that are configured based on CA (Carrier Aggregation).

The terminal 20 is a communication device provided with a radio communication function, such as a smartphone, a cellular phone, a tablet, a wearable terminal, a communication module for Machine-to-Machine (M2M), or the like. As illustrated in FIG. 1, the terminal 20 utilizes various communication services provided by a radio communication system by receiving control information or data in DL from the base station 10 and transmitting control information or data in UL to the base station 10.

Figure 2:
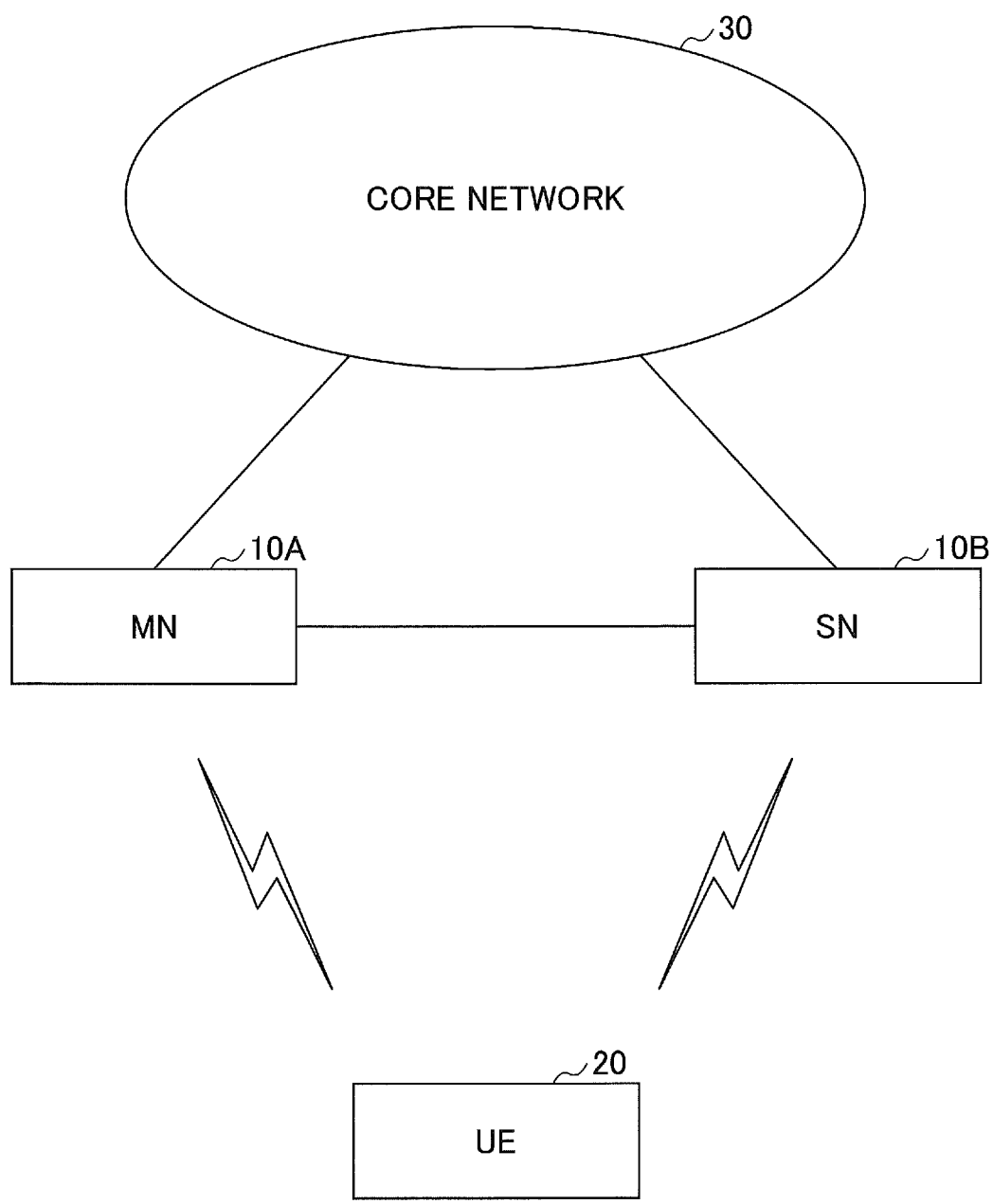
FIG. 2 is a diagram for illustrating an example (2) of a configuration of a radio communication system in an embodiment of the present invention.

FIG. 2 is a diagram for illustrating an example (2) of a configuration of a radio communication system according to an embodiment of the present invention. FIG. 2 shows a configuration example of a radio communication system when NR-Dual connectivity (NR-DC) is executed. As illustrated in FIG. 2, a base station 10A serving as a Master Node (MN) and a base station 10B serving as a Secondary Node (SN) are provided. Each of the base station 10A and the base station 10B is connected to a core network 30. The terminal 20 communicates with both of the base station 10A and the base station 10B. Note that a radio communication based on E-UTRA NR DC (EN-DC) may be configured in which a MN is an LTE base station and an SN is an NR base station.

A cell group provided by the base station 10A that is the MN is called a Master Cell Group (MCG), and a cell group provided by the base station 10B that is the SN is called a Secondary Cell Group (SCG). The operations described below may be performed in any of the configurations of FIG. 1 and FIG. 2.

Figure 3:
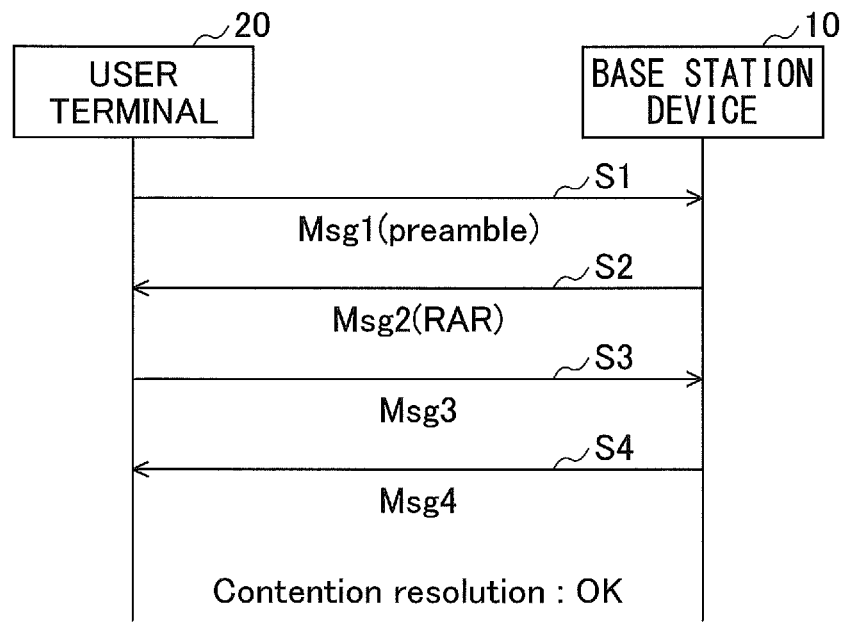
FIG. 3 is a diagram illustrating an example of a 4-step RACH.

FIG. 3 is a diagram illustrating an example of a 4-step RACH. An example of a 4-step random access procedure that can be executed in a radio communication system according to the embodiments is described with reference to FIG. 3. In the embodiments, a Contention based Random Access (CBRA) is described in which the number of steps is to be reduced. In a Contention Free Random Access (CFRA), basically, a random access procedure is completed upon receiving a Msg2 by a UE. Accordingly, compared to a CBRA, the number of steps is small. However, the embodiments are not limited the CBRA, and the embodiments may be applied to a CFRA.

In NR, a random access procedure can be executed by selecting an SS/PBCH block (which is also referred to as an SSB, or which may also be referred to as a synchronization signal block or a synchronization signal), or a random access procedure can be executed by selecting a Channel State Information-Reference Signal (CSI-RS).

For example, the base station device 10 transmits an SSB (or a CSI-RS) on a per beam basis, and the user terminal 20 monitors an SSB (or a CSI-RS) of each beam. The user terminal 20 selects an SSB (or a CSI-RS) with received power that is higher than a threshold value among a plurality of SSBs (or a plurality of CSI-RSs), and the user terminal 20 transmits a Message1 (Msg1 (=RA preamble)) using a PRACH resource (RACH occasion) corresponding to the selected SSB (or the selected CSI-RS) (S1 in FIG. 3). In the following, an RA preamble is referred to as a preamble, for convenience. Furthermore, a RACH occasion may be referred to as a PRACH occasion.

Upon detecting a preamble, the base station device 10 transmits the response that is a Message2 (Msg2 (=RAR)) to the user terminal 20 (S2). The user terminal 20 that receives the Msg2 transmits a Message3 (Msg3) including predetermined information to the base station device 10 (S3).

The base station device 10 that receives the Msg3 transmits a Message4 (Msg4) to the user terminal 20 (S4). Upon detecting that the above-described predetermined information is included in the Msg4, the user terminal 20 recognizes that the Msg4 corresponds to the above-described Msg3, and that the Msg4 is addressed to the user terminal 20 (Contention resolution: OK).

Since the above-described random access procedure consists of 4 steps, the above-described random access procedure is referred to as a 4-step RACH.

Figure 4:
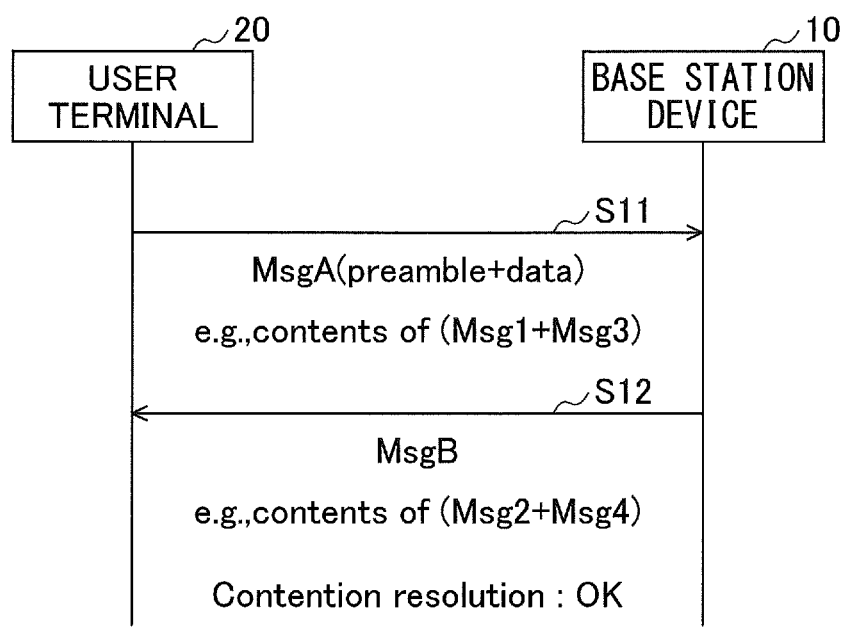
FIG. 4 is a diagram illustrating an example of a 2-step RACH.

FIG. 4 is a diagram illustrating an example of a 2-step RACH. A random access procedure in which the number of steps is reduced for low latency, for reducing power consumption, or the like is described with reference to FIG. 4.

At step S11, the user terminal 20 transmits a MessageA (MsgA) including a preamble and data to the base station device 10. As an example, the user terminal 20 selects a PRACH resource, similar to a selection of a PRACH resource (PRACH occasion) in a 4-step RACH, and the user terminal 20 transmits a preamble on the RACH resource. At the same time, the user terminal 20 transmits data on a PUSCH resource (which is referred to as a PUSCH occasion) associated with the PRACH resource. Note that, the preamble and the data equivalent, for example, to the Msg1 and the Msg3 in a 4-step RACH.

At S12, the base station device 10 transmits a MessageB (MsgB) to the user terminal 20. Content of the MsgB is equivalent, for example, to the Msg2 and the Msg4 in a 4-step RACH.

Since the above-described random access procedure consists of 2 steps, the above-described random access procedure is referred to as a 2-step RACH. A 2-step RACH is an example of a random access procedure in which the number of steps is reduced.

A preamble and a PUSCH in a 2-step RACH are assumed not to be a single body, at least from a perspective of a physical layer. For example, a combination of transmission messages on a preamble resource and a PUSCH resource, which are separated physical resources, is assumed to be referred to as a MsgA.

Namely, a single MsgA PUSCH occasion is assumed to be a single MsgA PUSCH resource, and a single MsgA RACH occasion is assumed to be a single MsgA preamble resource. Note that "a single resource" implies a resource used for one transmission. In the following, a MsgA PUSCH occasion is referred to as a PUSCH occasion, and a MsgA RACH occasion is referred to as a RACH occasion.

In the embodiments, the user terminal 20 is configured with a RACH occasion using an RRC message (RACH config). As for a PUSCH occasion, correspondence is defined between a PUSCH occasion and a RACH occasion, and the user terminal 20 determines a PUSCH occasion based on the correspondence.

Correspondence between a PUSCH occasion and a RACH occasion may be any one of one-to-one, many-to-one, one-to-many, and many-to-many.

In view of latency and the like, a PRACH occasion and a PUSCH occasion are preferably allocated to locations that are as close as possible, in a time domain. However, the RACH occasion and the PUSCH occasion are not limited to close locations.

In the embodiments, as a method of specifying a resource of a PUSCH occasion, the resource is specified by a relative position from a corresponding RACH occasion. However, this is an example, and a resource of a PUSCH occasion may be specified as an absolute location.

As for a RACH occasion, various time lengths, various types of periodicity, and various types of resource density are assumed based on configurations. Accordingly, resource specification methods for a PUSCH occasion are defined so that the various cases can be supported.

Figure 5:
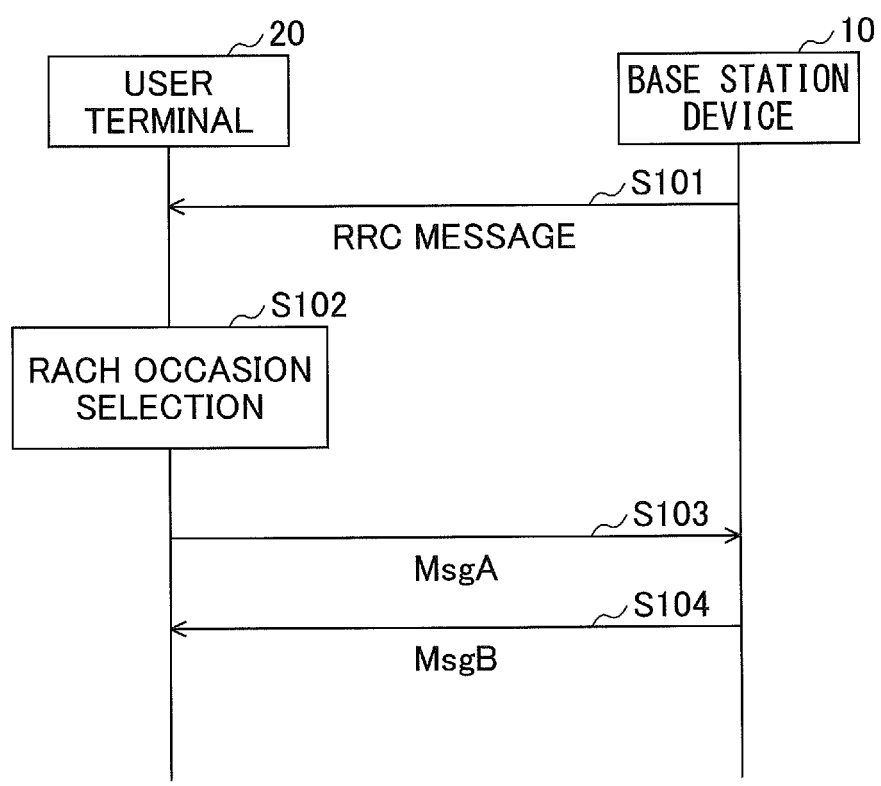
FIG. 5 is a sequence diagram illustrating an example of a random access in an embodiment of the present invention.

FIG. 5 is a sequence diagram illustrating an example of a random access in an embodiment of the present invention. An example of a basic operation is described with reference to FIG. 5.

At S101, the base station device 10 transmits, to the user terminal 20, an RRC message for configuring one or more RACH occasions (which may be referred to as a RACH resource). By the RRC message, a location of a PUSCH occasion (which may be referred to as a PUSCH resource) relative to the RACH occasion may be configured, or an absolute location of a PUSCH occasion may be configured. An RRC message includes broadcast information (which may be referred to as system information), such as a System Information Block (SIB).

A location of a PUSCH occasion relative to a RACH occasion may be specified by a technical specification document or the like, and a configuration by the base station device 10 to the user terminal 20 may be omitted. A fact that a relative location is specified by a technical specification document or the like implies that the user terminal 20 stores, in advance, information on the relative location in a storage means, such as a memory.

At S102, for example, the user terminal 20 selects one SSB with received power that is higher than a threshold value among a plurality of SSBs, and the user terminal 20 determines a RACH occasion corresponding to the selected SSB. The determined RACH occasion is one of the one or more RACH occasions configured at S101.

In the embodiments, a location of a PUSCH occasion is defined as a location relative to a RACH occasion. Accordingly, specifying a RACH occasion by the user terminal 20 implies that a PUSCH occasion corresponding to the RACH occasion (i.e., a PUSCH occasion with the relative location relation) is also specified at the same time.

At S103, the user terminal 20 transmits a MsgA (=preamble (Msg1)+data (Msg3)) to the base station device 10 using the RACH occasion and the PUSCH occasion specified at S102. At S104, the user terminal 20 receives a MsgB from the base station device 10.

In the following, an embodiment of a method of specifying a resource of a PUSCH occasion is described. In the following description, a preamble resource may be referred to as a PRACH resource or a PRACH occasion. Furthermore, a "resource" here is a resource specified by a time domain, a frequency domain, or a combination thereof, unless as otherwise specified.

Figure 6:
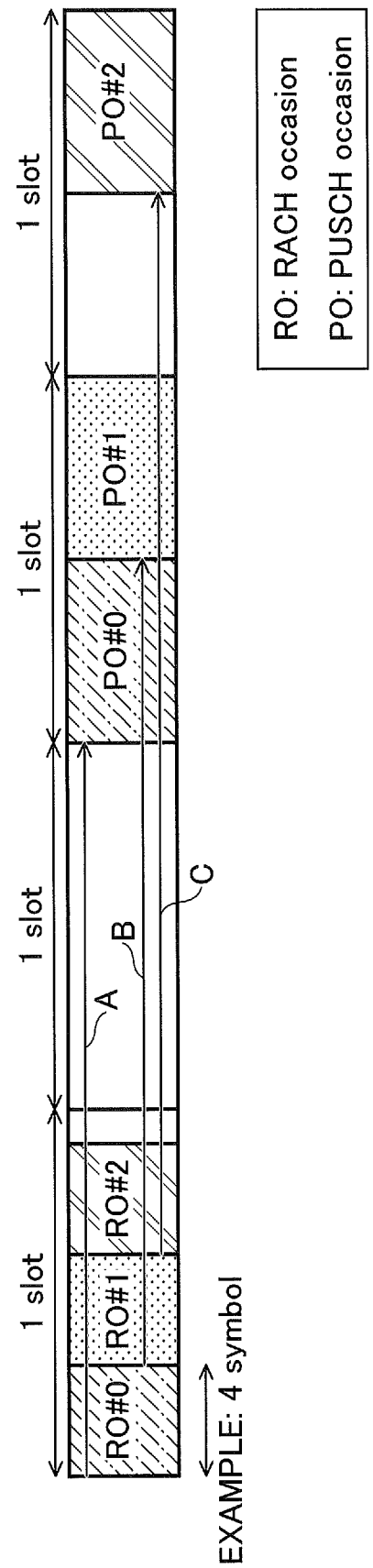
FIG. 6 is a diagram illustrating an example (1) of a transmission occasion for a random access.

FIG. 6 is a diagram illustrating an example (1) of a transmission occasion for a random access. An example of an operation of the terminal 20 is described with reference to FIG. 6. Note that, in the following description, "RO" represents a RACH occasion, and "PO" represent a PUSCH occasion.

In FIG. 6, a time domain location of a PO corresponding to an RO may be specified as a time length from a start location of the RO to a start location of the PO.

For example, suppose that the user terminal 20 selects RO#2 from RO#0-#2 based on received power of SSBs. In this case, the user terminal 20 determines, as a resource of PO#2, a resource with a start location that is located after a time length indicated by C from the start location of the RO#2.

In the example of FIG. 6, for PO#0-#2 corresponding to RO#0-#2, the time lengths representing the relative locations are separately specified or configured as A, B, and C. However, this is an example. A time length representing a relative position that is common among PO#0-#2 corresponding to RO#0-#2 may be specified or configured.

Here, in a MsgA PUSCH resource assignment of a 2-step random access procedure, a time domain location of a PUSCH slot including a MsgA PUSCH occasion (PUSCH occasion) is indicated by a time offset from a start location of a RACH slot including a MsgA RACH occasion (RACH occasion). The time offset (which is indicated, for example, by an information element msgAPUSCH-timeDomainOffset) may be in units of slots, and a time length of a slot may be determined based on subcarrier spacing of an Uplink Bandwidth part (UL-BWP) that is active at that time. In the following, a MsgA RACH slot is also denoted as a RACH slot, and a MsgA PUSCH slot is also denoted as a PUSCH slot. In the following, a "time domain location" is also referred to as a "time location."

FIG. 7 is a diagram illustrating an example (2) of a transmission occasion for a random access. As described above, a time offset from RO to PO may be specified in units of slots, and the time offset may be indicated from the base station 10 to the terminal 20. The time length of the slot is based on subcarrier spacing of an active UL-BWP. Accordingly, when subcarrier spacing of a PRACH preamble is the same as subcarrier spacing of a PUSCH, as illustrated in FIG. 7, the terminal 20 can specify a start location of a PUSCH slot.

FIG. 8 is a diagram illustrating an example (3) of a transmission occasion for a random access. When subcarrier spacing of a PRACH preamble is greater than subcarrier spacing of a PUSCH, a time length of a RACH slot is shorter than a time length of a PUSCH slot. FIG. 8 illustrates an example in which the subcarrier spacing of the PRACH preamble is 30 kHz, and the subcarrier spacing of the PUSCH (i.e., subcarrier spacing of an active UL-BWP) is 15 kHz. Here, as illustrated in FIG. 8, when the RACH slot is started from the start of the RACH slot, the terminal 20 can clearly specify the start location of the PUSCH slot that is obtained by adding the time offset of 2 slots to the start location of the RACH slot.

FIG. 9 is a diagram illustrating an example (4) of a transmission occasion for a random access. FIG. 9 illustrates an example in which the subcarrier spacing of the PRACH preamble is 30 kHz, and the subcarrier spacing of the PUSCH (i.e., subcarrier spacing of an active UL-BWP) is 15 kHz. Here, as illustrated in FIG. 9, when the RACH slot is started from the latter half of the RACH slot, the terminal 20 is unable to clearly specify a start location of the PUSCH slot that is obtained by adding the time offset of 2 slots to the start location of the RACH slot. Namely, the time domain location obtained by adding the time offset to the start location of the RACH slot is in the middle of the slot. Accordingly, the terminal 20 is unable to determine a start location of the PUSCH slot appropriately.

Accordingly, a start location of a PUSCH slot may be changed based on a time domain location specified by a time offset. In the following examples, the time offset is 2 slots. However, a time offset may be set to another number of slots.

FIG. 10 is a diagram illustrating an example (1) of a transmission occasion for a random access in an embodiment of the present invention. For example, as illustrated in FIG. 10, a PUSCH slot may be started from a slot boundary located prior to the specified time domain location. Namely, a PUSCH slot may be specified so as to include the specified time domain location. When a time domain location specified by adding a time offset to a RACH slot is not located at a slot boundary, a PUSCH slot may be specified as illustrated in FIG. 10.

Figure 11:
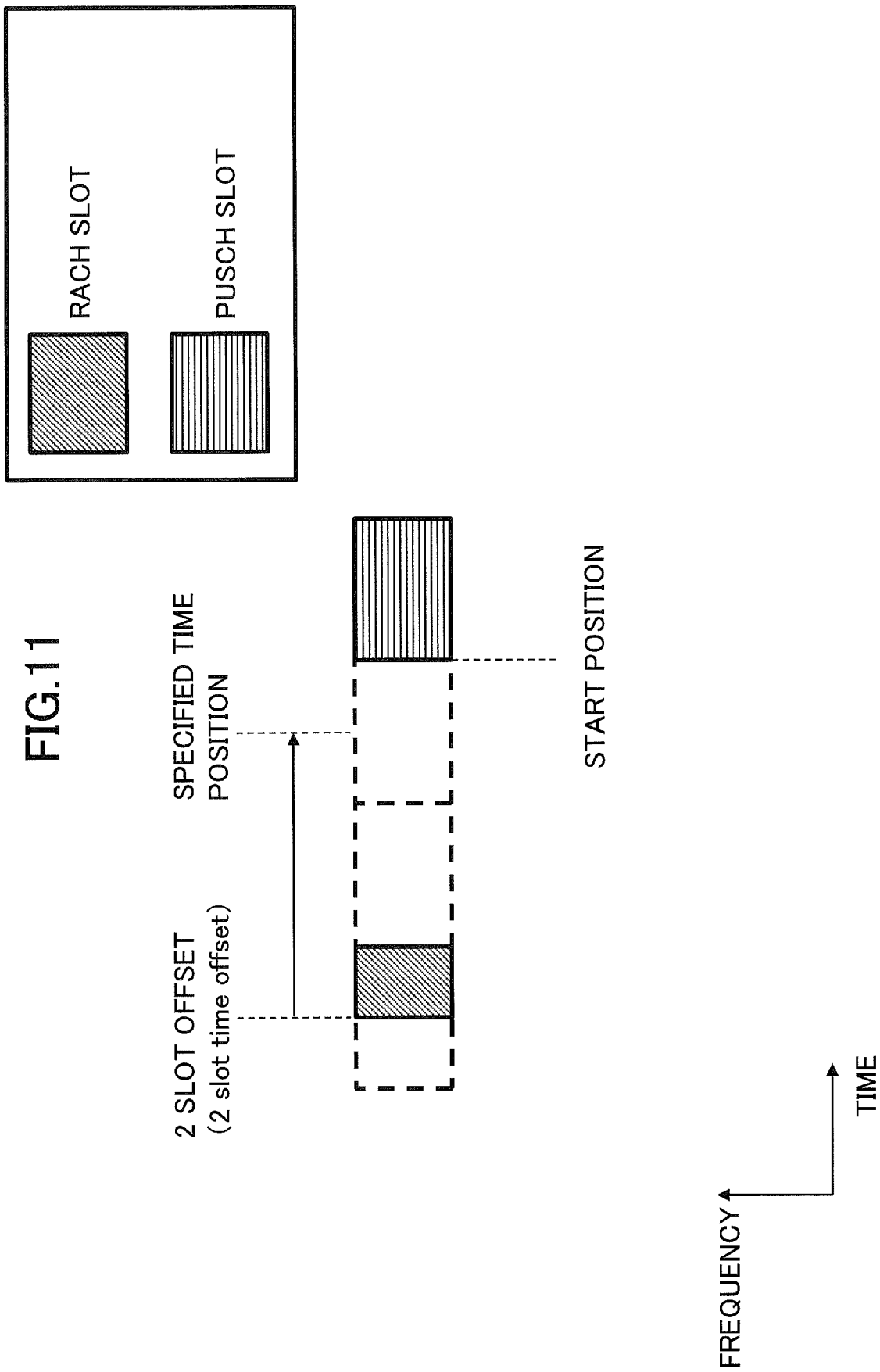
FIG. 11 is a diagram illustrating an example (2) of a transmission occasion for a random access in an embodiment of the present invention.

FIG. 11 is a diagram illustrating an example (2) of a transmission occasion for a random access in an embodiment of the present invention. For example, as illustrated in FIG. 11, a PUSCH slot may be started from a slot boundary subsequent to the specified time domain location. When a time domain location specified by adding a time offset to a RACH slot is not located at a slot boundary, a PUSCH slot may be specified as illustrated in FIG. 11.

Furthermore, a start location of a RACH slot that is a start point of a time offset may be changed.

FIG. 12 is a diagram illustrating an example (3) of a transmission occasion for a random access in an embodiment of the present invention. For example, as illustrated in FIG. 12, a start of a slot including a RACH slot may be set to a start point of a time offset. A PUSCH slot is started from a start location specified by adding the time offset to the start point. When a time domain location specified by adding a time offset to a RACH slot is not located at a slot boundary, a start location of a RACH slot that is a start point of a time offset may be changed, as illustrated in FIG. 12.

Figure 13:
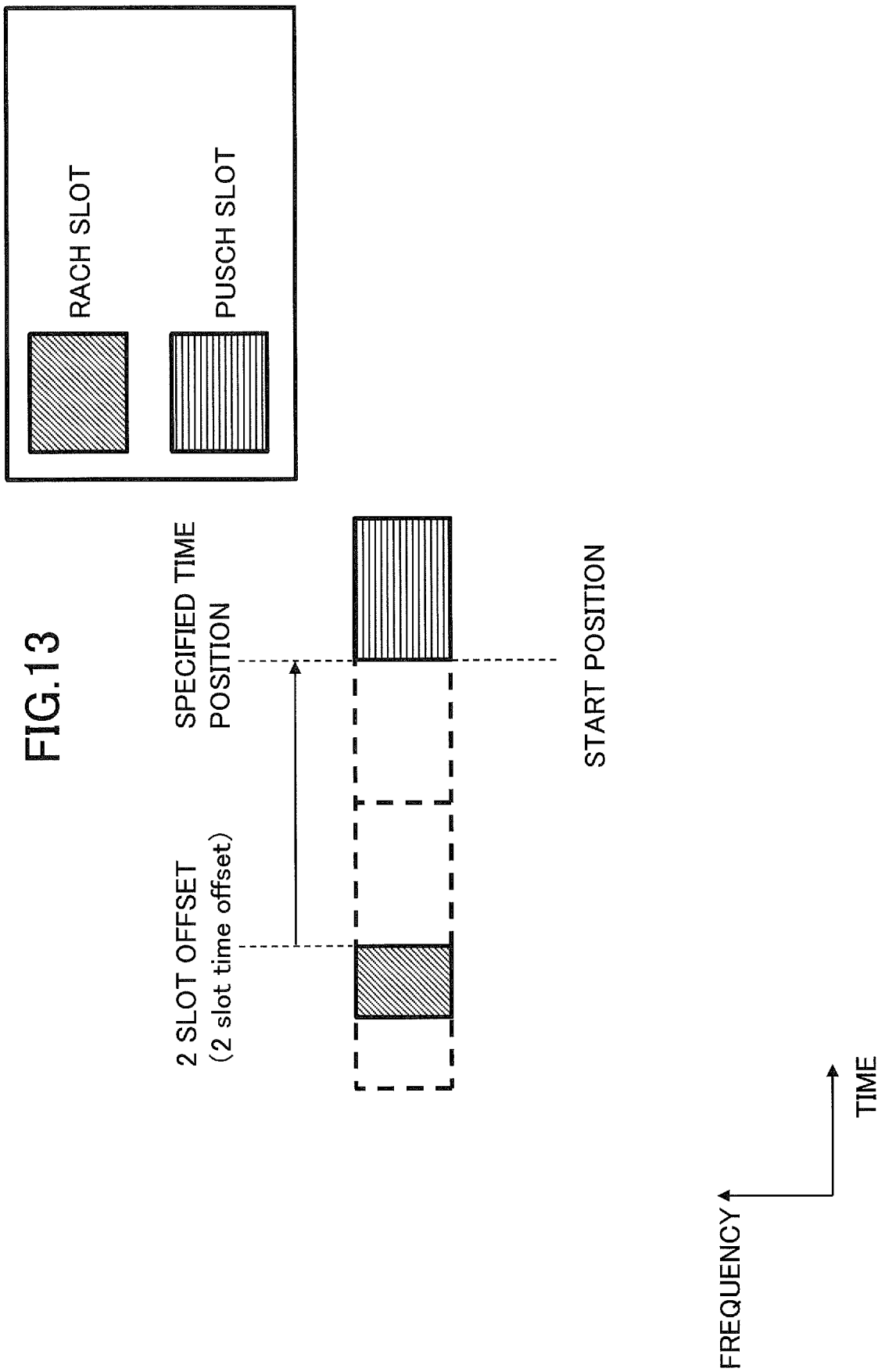
FIG. 13 is a diagram illustrating an example (4) of a transmission occasion for a random access in an embodiment of the present invention.

FIG. 13 is a diagram illustrating an example (4) of a transmission occasion for a random access in an embodiment of the present invention. For example, as illustrated in FIG. 13, a start of a slot subsequent to a slot including a RACH slot may be set to a start point of a time offset. A PUSCH slot is started from a start location specified by adding the time offset to the start point. When a time domain location specified by adding a time offset to a RACH slot is not located at a slot boundary, a start location of a RACH slot that is a start point of a time offset may be changed, as illustrated in FIG. 13.

FIG. 14 is a diagram illustrating an example (5) of a transmission occasion for a random access in an embodiment of the present invention. For example, as illustrated in FIG. 14, the terminal 20 may assume that a PUSCH slot started from a start location specified by a time offset is for a MsgA PUSCH transmission, and the terminal 20 may transmit the MsgA PUSCH based on a resource assignment in the PUSCH slot. Namely, a MsgA PUSCH slot may be started from a location in the middle of a slot.

FIG. 15 is a diagram illustrating an example (6) of a transmission occasion for a random access in an embodiment of the present invention. For example, there is a case in which a plurality of RACH slots is continued within a time range of a RACH slot corresponding to an assumed PUSCH slot. A start location of a PUSCH slot may be determined by applying any of the methods illustrated in FIG. 10 to FIG. 14 to the latter half RACH slot of the continued RACH slots. FIG. 15 is an example in which the method illustrated in FIG. 11, i.e., a method in which a PUSCH slot is started from a slot boundary subsequent to a specified time domain location, is applied to the latter half RACH slot. Here, as for the first half RACH slot, the PUSCH slot is started, as usual, from a time domain location specified by adding the time offset of 2 slots to the start location of the RACH slot.

Figure 16:
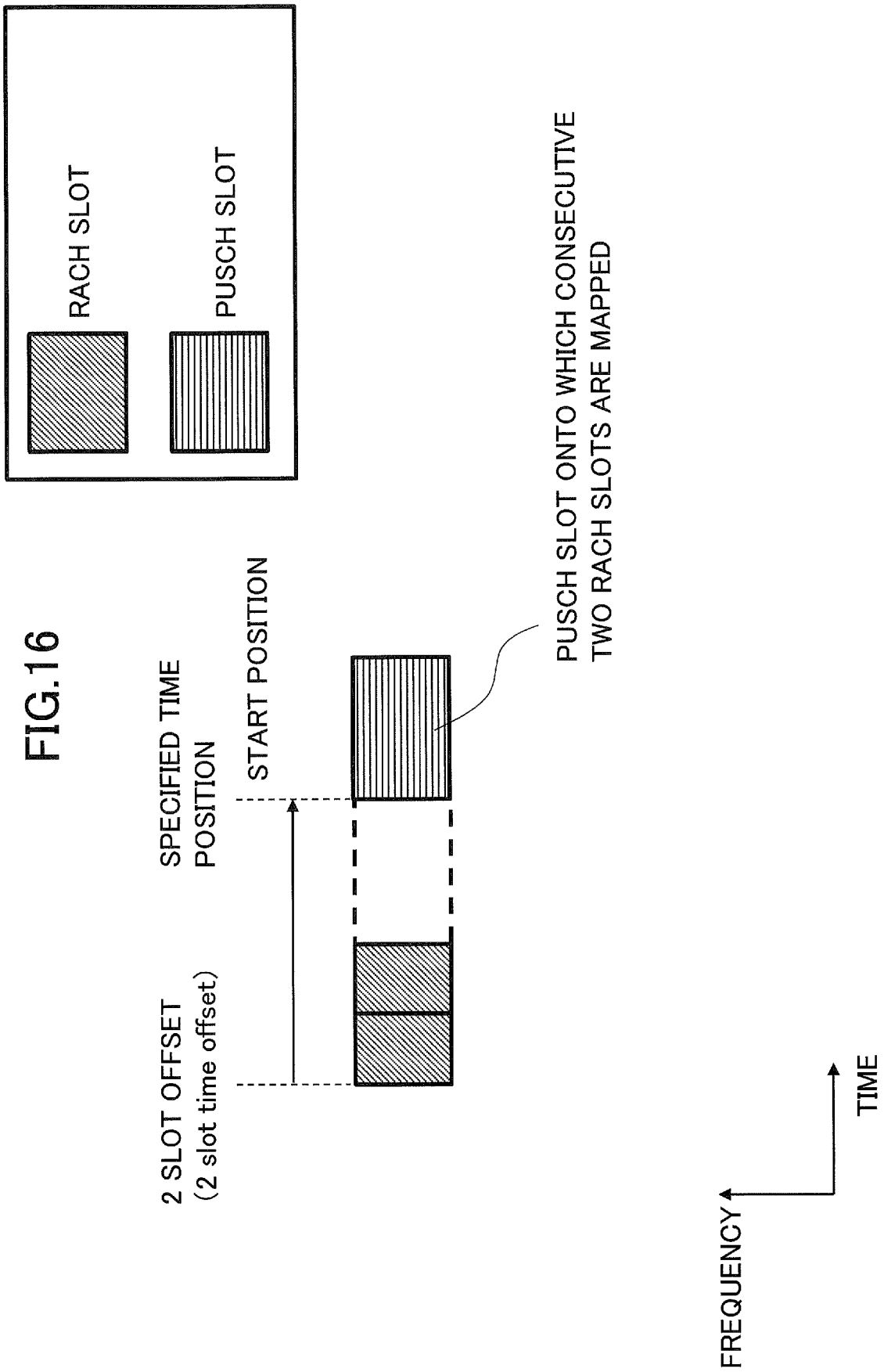
FIG. 16 is a diagram illustrating an example (7) of a transmission occasion for a random access in an embodiment of the present invention.

FIG. 16 is a diagram illustrating an example (7) of a transmission occasion for a random access in an embodiment of the present invention. For example, a time offset common among a plurality of RACH slots of continued RACH slots may be specified. As illustrated in FIG. 16, a start location of the PUSCH slot may be determined by adding the time offset to the start of the continued RACH slots. Both of the continued 2 RACH slots are mapped onto the PUSCH slot.

According to the above-described embodiments, in a 2-step random access procedure, the terminal 20 can specify a start location of a MsgA PUSCH slot by adding a time offset to a start location of a MsgA RACH slot, regardless of subcarrier spacing.

Namely, in a radio communication system, a time domain location of a transmission occasion during a random access procedure can be determined.

(Device Configurations)

Next, examples of functional configurations of the base station 10 and the terminal 20 for executing the above-described processing and operation are described. The base station 10 and the terminal 20 include functions for executing the above-described embodiments. However, each of the base station 10 and the terminal 20 may only be provided with a part of the functions in the embodiments.

<Base Station 10>

Figure 17:
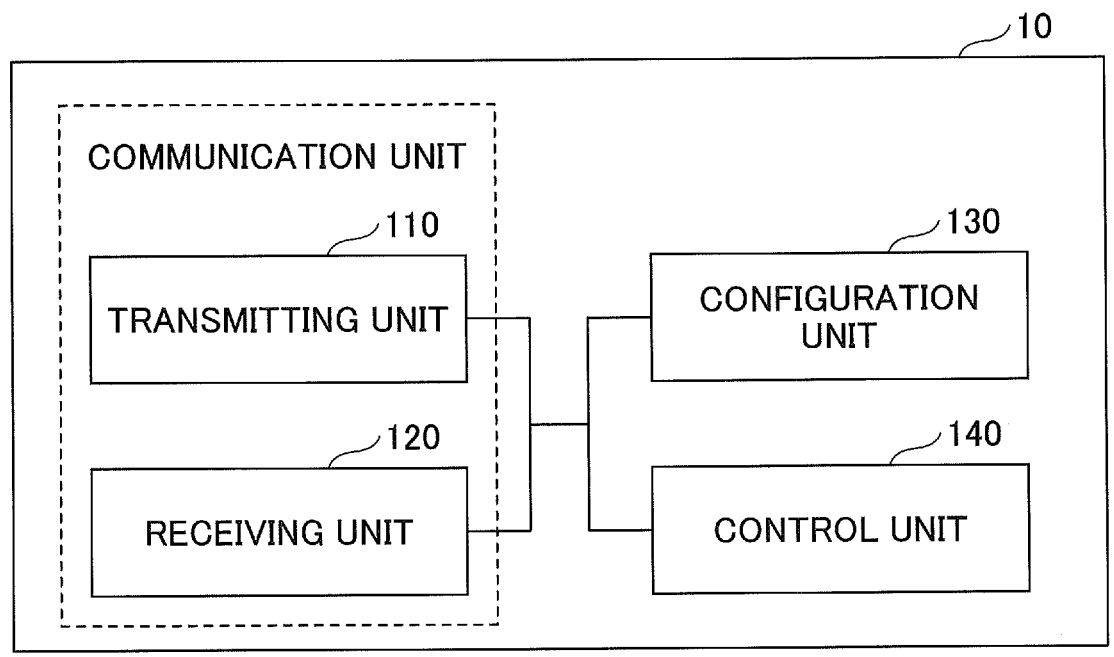
FIG. 17 is a diagram illustrating an example of a functional configuration of a base station 10 according to an embodiment of the present invention.

FIG. 17 is a diagram illustrating an example of a functional configuration of the base station 10 in an embodiment of the present invention. As illustrated in FIG. 17, the base station 10 includes a transmitting unit 110; a receiving unit 120; a configuration unit 130; and a control unit 140. The functional configuration illustrated in FIG. 17 is merely an example. Functional division and names of functional units may be any division and names, provided that operation according to the embodiments of the present invention can be executed.

The transmitting unit 110 includes a function for generating a signal to be transmitted to the terminal 20 and for transmitting the signal through radio. The transmitting unit 110 transmits an inter network node message to another network node. The receiving unit 120 includes a function for receiving various signals transmitted from the terminal 20 and retrieving, for example, information of a higher layer from the received signals. The transmitting unit 110 has a function to transmit NR-PSS, NR-SSS, NR-PBCH, DL/UL control signals, reference signals and the like, to the terminal 20. The receiving unit 120 receives an inter network node message from another network node. The transmitting unit 110 and the receiving unit 120 may be combined as a communication unit.

The configuration unit 130 stores preconfigured configuration information and various types of configuration information to be transmitted to the terminal 20 in a storage device, and reads out the information if necessary. Content of the configuration information is, for example, information required for a random access or the like.

As described in the embodiments, the control unit 140 performs control for a random access. A functional unit related to signal transmission in the control unit 140 may be included in the transmitting unit 110, and a functional unit related to signal reception in the control unit 140 may be included in the receiving unit 120.

<Terminal 20>

Figure 18:
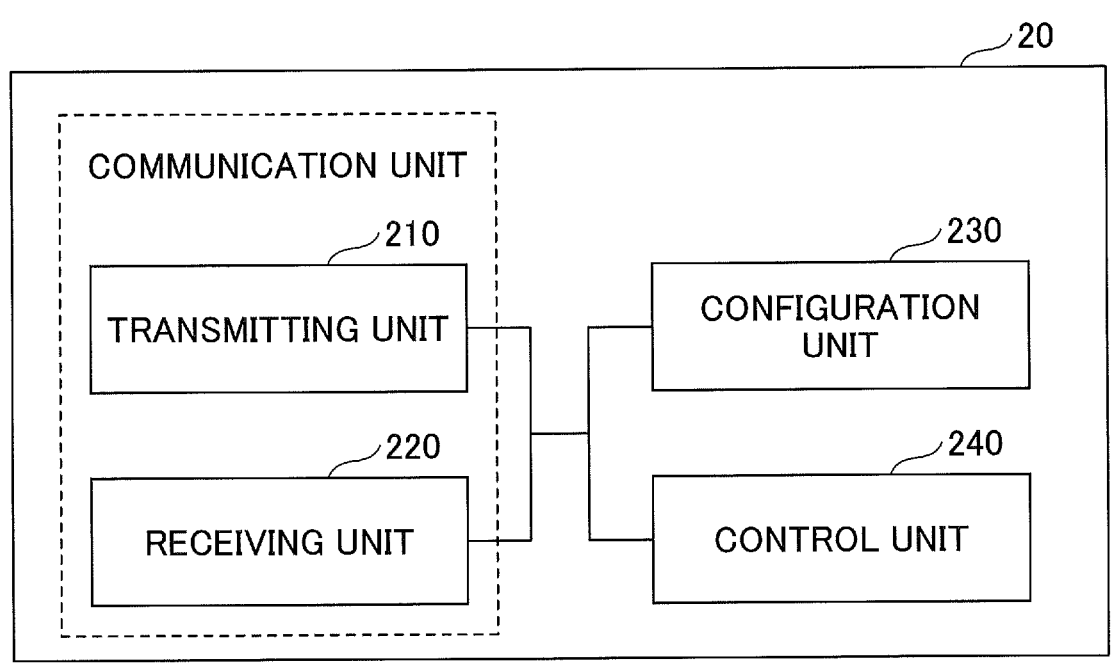
FIG. 18 is a diagram illustrating an example of a functional configuration of a terminal 20 according to an embodiment of the present invention.

FIG. 18 is a diagram illustrating an example of a functional configuration of a terminal 20 according to an embodiment of the present invention. As illustrated in FIG. 18, the terminal 20 includes a transmitting unit 210; a receiving unit 220; a configuration unit 230; and a control unit 240. The functional configuration illustrated in FIG. 18 is only one example. The functional division and the names of the functional units may be any division and names, provided that operations of the embodiments of the present invention can be executed.

The transmitting unit 210 is provided with a function for creating a transmission signal from transmission data and for transmitting the transmission signal through radio. The receiving unit 220 receives various signals through radio and retrieves higher layer signals from the received physical layer signals. The receiving unit 220 has a function to receive NR-PSS, NR-SSS, NR-PBCH, DL/UL/SL control signals, or the like transmitted from the base station 10. For example, the transmitting unit 210 transmits Physical Sidelink Control Channel (PSCCH), Physical Sidelink Shared Channel (PSSCH), Physical Sidelink Discovery Channel (PSDCH), Physical Sidelink Broadcast Channel (PSBCH), and the like to another terminal 20 as D2D communication, and the receiving unit 220 receives PSCCH, PSSCH, PSDCH, PSBCH, and the like from another terminal 20. The transmitting unit 210 and the receiving unit 220 may be combined as a communication unit.

The configuration unit 230 stores various types of configuration information received from the base station 10 or the terminal 20 by the receiving unit 220 in a storage device, and reads out the various types of configuration information, if necessary. The configuration unit 230 also stores preconfigured configuration information. The content of the configuration information is, for example, information required for a random access, and the like.

As described in the embodiments, the control unit 240 performs control for a random access. A functional unit related to signal transmission in the control unit 240 may be included in the transmitting unit 210, and a functional unit related to signal reception in the control unit 240 may be included in the receiving unit 220.

(Hardware Configuration)

The block diagrams (FIG. 17 and FIG. 18) used for the description of the above embodiments illustrate blocks of functional units. These functional blocks (components) are implemented by any combination of at least one of hardware and software. In addition, the implementation method of each functional block is not particularly limited. That is, each functional block may be implemented using a single device that is physically or logically combined, or may be implemented by directly or indirectly connecting two or more devices that are physically or logically separated (e.g., using wire or radio) and using these multiple devices. The functional block may be implemented by combining software with the above-described one device or the above-described plurality of devices.

Functions include, but are not limited to, judgment, decision, determination, computation, calculation, processing, derivation, research, search, verification, reception, transmission, output, access, resolution, choice, selection, establishment, comparison, assumption, expectation, deeming, broadcasting, notifying, communicating, forwarding, configuring, reconfiguring, allocating, mapping, assigning, or the like. For example, a functional block (component) that functions to transmit is called a transmitting unit or a transmitter. In either case, as described above, the implementation method is not particularly limited.

Figure 19:
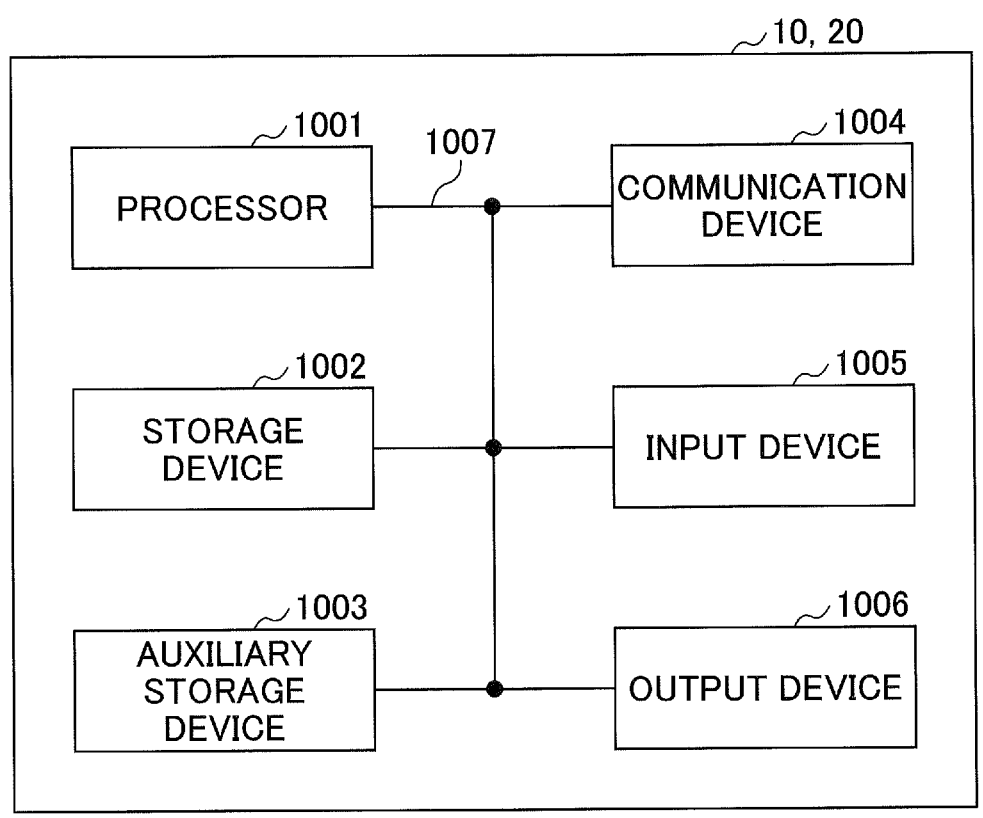
FIG. 19 is a diagram illustrating a hardware configuration of the base station 10 or the terminal 20 according to an embodiment of the present invention.

For example, the base station 10, the terminal 20, or the like in an embodiment of the present invention may function as a computer for performing a process of the radio communication method according to the present disclosure. FIG. 19 is a diagram illustrating an example of a hardware configuration of the base station 10 and the terminal 20 according to an embodiment of the present disclosure. Each of the base station 10 and the terminal 20 described above may be physically configured as a computer device including a processor 1001, a storage device 1002, an auxiliary storage device 1003, a communication device 1004, an input device 1005, an output device 1006, a bus 1007, and the like.

In the following description, the term "device" can be read as a circuit, device, unit, or the like. The hardware configuration of each of the base station 10 and the terminal 20 may be configured to include each device depicted, or may be configured without including some devices.

Each function in each of the base station 10 and the terminal 20 is implemented such that predetermined software (program) is read on hardware such as the processor 1001, the storage device 1002 and the like, and the processor 1001 performs an operation and controls communication by the communication device 1004 and at least one of reading and writing of data in the storage device 1002 and the auxiliary storage device 1003.

For example, the processor 1001 operates an operating system and controls the entire computer. The processor 1001 may be configured with a central processing unit (CPU) including an interface with a peripheral device, a control device, an operation device, a register, and the like. For example, the above-described control unit 140, the control unit 240, and the like may be implemented by the processor 1001.

Furthermore, the processor 1001 reads a program (program code), a software module, data, or the like from at least one of the auxiliary storage device 1003 and the communication device 1004 out to the storage device 1002, and executes various types of processes according to them. A program causing a computer to execute at least some of the operations described in the above embodiments is used as the program. For example, the control unit 140 of the base station 10 illustrated in FIG. 17 may be implemented by a control program which is stored in the storage device 1002 and operates on the processor 1001. Furthermore, for example, the control unit 240 of the terminal 20 illustrated in FIG. 18 may be implemented by a control program which is stored in the storage device 1002 and operates on the processor 1001. Various types of processes are described to be executed by one processor 1001 but may be executed simultaneously or sequentially by two or more processors 1001. The processor 1001 may be implemented by one or more chips. The program may be transmitted from a network via an electric communication line.

The storage device 1002 is a computer readable recording medium and configured with at least one of a read only memory (ROM), an erasable programmable ROM (EPROM), an electrically erasable programmable ROM (EEPROM), a random access memory (RAM), and the like. The storage device 1002 is also referred to as a "register," a "cache," a "main memory," or the like. The storage device 1002 can store programs (program codes), software modules, or the like which are executable for carrying out the communication method according to an embodiment of the present disclosure.

The auxiliary storage device 1003 is a computer-readable recording medium and may be configured with, for example, at least one of an optical disk such as a compact disc ROM (CD-ROM), a hard disk drive, a flexible disk, a magneto-optical disk (for example, a compact disk, a digital versatile disk, or a Blu-ray (registered trademark) disc, a smart card, a flash memory (for example, a card, a stick, or a key drive), a floppy (registered trademark) disk, a magnetic strip, and the like. The above-described recording medium may be, for example, a database, a server, or any other appropriate medium including at least one of the storage device 1002 and the auxiliary storage device 1003.

The communication device 1004 is hardware (a transmitting and receiving device) for performing communication between computers via at least one of a wired network and a wireless network and is also referred to as a "network device," a "network controller," a "network card," a "communication module," or the like. The communication device 1004 may be configured to include a high frequency switch, a duplexer, a filter, a frequency synthesizer, and the like to implement at least one of frequency division duplex (FDD) and time division duplex (TDD). For example, transmitting and receiving antennas, an amplifier, a transceiver, a transmission line interface, and the like may be implemented by the communication device 1004. The transceiver may be implemented such that a transmitter and a receiver are physically or logically separated.

The input device 1005 is an input device that receives an input from the outside (such as a keyboard, a mouse, a microphone, a switch, a button, a sensor, or the like). The output device 1006 is an output device that performs an output to the outside (for example, a display, a speaker, an LED lamp, or the like). The input device 1005 and the output device 1006 may be integrally configured (for example, a touch panel).

The devices such as the processor 1001 and the storage device 1002 are connected by the bus 1007 to communicate information with each other. The bus 1007 may be configured with a single bus or may be configured with different buses between the devices.

Furthermore, each of the base station 10 and the terminal 20 may be configured to include hardware such as a microprocessor, a digital signal processor (DSP), an application specific integrated circuit (ASIC), a programmable logic device (PLD), or a field programmable gate array (FPGA), or all or some of the functional blocks may be implemented by hardware. For example, the processor 1001 may be implemented by at least one of these pieces of hardware.

(Conclusion of the Embodiments)

As described above, according to the embodiments of the present invention, there is provided a terminal including a receiving unit that receives, from a base station, a parameter for a random access procedure; a control unit that determines a time domain location of the PUSCH slot based on a time domain location of a Physical Random Access Channel (RACH) slot, subcarrier spacing of the RACH slot, subcarrier spacing of a Physical Uplink Shared Channel (PUSCH) slot, and the parameter; and a transmitting unit that transmits, at the determined time domain location, the PUSCH to the base station.

According to the above-described configuration, in a 2-step random access procedure, the terminal 20 can specify a start location of a MsgA PUSCH slot by adding a time offset to a start location of a MsgA RACH slot, regardless of subcarrier spacing. Namely, in a radio communication system, a time domain location of a transmission occasion during a random access procedure can be determined.

The parameter may be a time offset for determining, from a time domain location at which the RACH slot is started, a time domain location at which the PUSCH slot is started. According to this configuration, in a 2-step random access procedure, the terminal 20 can specify a start location of a MsgA PUSCH slot by adding a time offset to a start location of a MsgA RACH slot, regardless of subcarrier spacing.

When the subcarrier spacing of the RACH slot is greater than the subcarrier spacing of the PUSCH slot, the control unit may determine that the PUSCH slot is started from a slot boundary prior to a time domain location specified by adding the time offset to the time domain location at which the RACH slot is started, or is started from a slot boundary subsequent to the time domain location specified by adding the time offset to the time domain location at which the RACH slot is started. According to this configuration, in a 2-step random access procedure, the terminal 20 can specify a start location of a MsgA PUSCH slot by adding a time offset to a start location of a MsgA RACH slot, regardless of subcarrier spacing.

When the subcarrier spacing of the RACH slot is greater than the subcarrier spacing of the PUSCH slot, the control unit may determine the time domain location of the PUSCH slot by specifying a slot boundary prior to the time domain location at which the RACH slot is started or specifying a slot boundary subsequent to the time domain location at which the RACH slot is started, as the time domain location at which the RACH slot is started. According to this configuration, in a 2-step random access procedure, the terminal 20 can specify a start location of a MsgA PUSCH slot by adding a time offset to a start location of a MsgA RACH slot, regardless of subcarrier spacing.

When the subcarrier spacing of the RACH slot is greater than the subcarrier spacing of the PUSCH slot, and when two slots of the RACH slot are continuously allocated, the control unit may determine that the PUSCH slot is started from a slot boundary prior to a time domain location specified by adding the time offset to a time domain location at which the latter half RACH slot of the continued two RACH slots is started, or from a slot boundary subsequent to the time domain location specified by adding the time offset to the time domain location at which the latter half RACH slot is started. According to this configuration, in a 2-step random access procedure, the terminal 20 can specify a start location of a MsgA PUSCH slot by adding a time offset to a start location of a MsgA RACH slot, regardless of subcarrier spacing.

There is provided a communication method in which a terminal executes: a receiving procedure of receiving, from a base station, a parameter for a random access procedure; a control procedure of determining, based on a time domain location of a Physical Random Access Channel (RACH) slot, subcarrier spacing of the RACH slot, subcarrier spacing of a Physical Uplink Shared Channel (PUSCH) slot, and the parameter, a time domain location of the PUSCH slot; and a transmitting procedure of transmitting, at the determined time domain location, the PUSCH to the base station.

According to the above-described configuration, in a 2-step random access procedure, the terminal 20 can specify a start location of a MsgA PUSCH slot by adding a time offset to a start location of a MsgA RACH slot, regardless of subcarrier spacing. Namely, in a radio communication system, a time domain location of a transmission occasion during a random access procedure can be determined.

Supplemental Embodiment

The exemplary embodiment of the present invention has been described above, but the disclosed invention is not limited to the above embodiments, and those skilled in the art would understand various modified examples, revised examples, alternative examples, substitution examples, and the like. In order to facilitate understanding of the invention, specific numerical value examples have been used for description, but the numerical values are merely examples, and certain suitable values may be used unless otherwise stated. The classification of items in the above description is not essential to the present invention. Matters described in two or more items may be combined and used if necessary, and a matter described in one item may be applied to a matter described in another item (unless inconsistent). The boundary between functional units or processing units in a functional block diagram does not necessarily correspond to the boundary between physical parts. Operations of a plurality of functional units may be performed physically by one component, or an operation of one functional unit may be physically performed by a plurality of parts. In the processing procedure described in the embodiments, the order of the processes may be changed as long as there is no inconsistency. For the sake of convenience of processing description, the base station 10 and the terminal 20 are described using the functional block diagrams, but such devices may be implemented by hardware, software, or a combination thereof. Software executed by the processor included in the base station 10 according to the embodiment of the present invention and software executed by the processor included in the terminal 20 according to the embodiment of the present invention may be stored in a random access memory (RAM), a flash memory, a read-only memory (ROM), an EPROM, an EEPROM, a register, a hard disk (HDD), a removable disk, a CD-ROM, a database, a server, or any other appropriate storage medium.

Furthermore, a notification of information is not limited to the aspect or embodiment described in the present disclosure and may be provided by any other method. For example, the notification of information may be given by physical layer signaling (for example, downlink control information (DCI) or uplink control information (UCI)), higher layer signaling (for example, radio resource control (RRC) signaling, medium access control (MAC) signaling, broadcast information (master information block (MIB), system information block (SIB)), other signals, or a combination thereof. Furthermore, the RRC signaling may be referred to as an RRC message and may be, for example, an RRC connection setup message, an RRC connection reconfiguration message, or the like.

Each aspect and embodiment described in the present disclosure may be applied to at least one of Long Term Evolution (LTE), LTE-advanced (LTE-A), SUPER 3G, IMT-advanced, 4th generation mobile communication system (4G), 5th generation mobile communication system (5G), Future Radio Access (FRA), New Radio (NR), W-CDMA (registered trademark), GSM (registered trademark), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), a system using any other appropriate system, and next generation systems extended based on these standards. Furthermore, a plurality of systems (e.g., a combination of at least one of LTE and LTE-A with 5G) may be combined to be applied.

The processing procedures, the sequences, the flowcharts, and the like of the respective aspects/embodiments described in this specification may be reversed in order provided that there is no contradiction. For example, the method described in the present disclosure presents elements of various steps with an exemplary order and is not limited to a presented specific order.

In this specification, a specific operation to be performed by the base station 10 may be performed by an upper node in some cases. In the network including one or more network nodes including the base station 10, various operations performed for communication with the terminal 20 can be obviously performed by at least one of the base station 10 and any network node (for example, an MME, an S-GW, or the like is considered, but it is not limited thereto) other than the base station 10. A case is exemplified above in which there is one network node other than the base station 10. The one network node may be a combination of a plurality of other network nodes (e.g., MME and S-GW).

Information, a signal, or the like described in the present disclosure may be output from a higher layer (or a lower layer) to a lower layer (or a higher layer layer). Information, a signal, or the like described in the present disclosure may be input and output via a plurality of network nodes.

Input and output information and the like may be stored in a specific place (for example, a memory) or may be managed through a management table. Input and output information and the like may be overwritten, updated, or additionally written. Output information and the like may be deleted. Input information and the like may be transmitted to another device.

The determination in the present disclosure may be performed in accordance with a value (0 or 1) indicated by one bit, may be performed in accordance with a Boolean value (true or false), or may be performed by a comparison of numerical values (for example, a comparison with a predetermined value).

Software can be interpreted widely to mean a command, a command set, a code, a code segment, a program code, a program, a subprogram, a software module, an application, a software application, a software package, a routine, a subroutine, an object, an executable file, an execution thread, a procedure, a function, and the like regardless of whether software is called software, firmware, middleware, a microcode, a hardware description language, or any other name.

Further, software, commands, information, and the like may be transmitted and received via a transmission medium. For example, when software is transmitted from a web site, a server, or any other remote source using a wired technology (such as a coaxial cable, a fiber optic cable, a twisted pair, or a digital subscriber line (DSL)) and a radio technology (such as infrared rays or a microwave), at least one of the wired technology and the radio technology are included in a definition of a transmission medium.

Information, signals, and the like described in the present disclosure may be indicated using any one of a variety of different techniques. For example, data, instructions, commands, information, signals, bits, symbols, chips, and the like which are mentioned throughout the above description may be indicated by voltages, currents, electromagnetic waves, magnetic particles, optical fields or photons, or any combination thereof.

The terms described in the present disclosure and terms necessary for understanding the present disclosure may be replaced with terms having the same or similar meanings. For example, at least one of a channel and a symbol may be a signal. Further, a signal may be a message. Further, a component carrier (CC) may be referred to as a "carrier frequency," a "cell," or the like.

The terms "system" and "network" used in the present disclosure are used interchangeably.

Further, information, parameters, and the like described in the present disclosure may be indicated by absolute values, may be indicated by relative values from predetermined values, or may be indicated by corresponding other information. For example, radio resources may be those indicated by an index.

The names used for the above-described parameters are not limited in any respect. Further, mathematical formulas or the like using the parameters may be different from those explicitly disclosed in the present disclosure. Since various channels (for example, a PUCCH, a PDCCH, and the like) and information elements can be identified by suitable names, various names assigned to the various channels and the information elements are not limited in any respect.

In the present disclosure, the terms "base station (BS)," "radio base station," "base station device," "fixed station," "Node B," "eNode B (eNB)," "gNodeB (gNB)," "access point," "transmission point," "reception point," "transmission/reception point," "cell," "sector," "cell group," "carrier," "component carrier," and the like can be used interchangeably. The base stations may also be indicated by terms such as a macrocell, a small cell, a femtocell, and a picocell.

The base station eNB can accommodate one or more (for example, three) cells. In a case in which the base station accommodates a plurality of cells, the entire coverage area of the base station can be partitioned into a plurality of small areas, and each small area can provide a communication service through a base station subsystem (for example, a small indoor base station (a remote radio head (RRH)). The term "cell" or "sector" refers to the whole or a part of the coverage area of at least one of the base station and the base station subsystem that performs a communication service in the coverage.

In the present disclosure, the terms "mobile station (MS)," "user terminal," "user equipment (UE)," "terminal," and the like can be used interchangeably.

The mobile station may be referred to, by a person ordinarily skilled in the art, as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable term.

At least one of the base station and the mobile station may be also referred to as a transmitting device, a receiving device, a communication device, or the like. At least one of the base station and the mobile station may be a device installed in a mobile body, a mobile body itself, or the like. The mobile body may be a vehicle (for example, a car, an airplane, or the like), an unmanned body that moves (for example, a drone, an autonomous car or the like), or a robot (manned type or unmanned type). At least one of the base station and the mobile station includes a device which need not necessarily move during a communication operation. For example, at least one of the base station and the mobile station may be an Internet of things (IoT) device such as a sensor.

Further, the base station in the present disclosure may be replaced with a user terminal. For example, each aspect/ embodiment of the present disclosure may be applied to a configuration in which communication between the base station and the terminal is replaced with communication between a plurality of terminals 20 (for example, which may be referred to as device-to-device (D2D) or vehicle-to-everything (V2X)). In this case, the terminal 20 may have the functions of the base station 10 described above. Further, the terms "uplink" and "downlink" may be replaced with terms (for example, "side") corresponding to inter-terminal communication. For example, an uplink channel, a downlink channel, or the like may be replaced with side channels.

Similarly, the user terminal in the present disclosure may be replaced with the base station. In this case, the base station may have the functions of the above-mentioned user terminal.

The terms "determination(determining)" and "decision (determining)" used in the present specification may include various types of operations. The "determination" and "decision" may include deeming "judging," "calculating," "computing," "processing," "deriving," "investigating," "looking up (for example, searching in a table, a database, or another data structure)," or "ascertaining" as "determining" and/or "deciding." Furthermore, the "determination" and "decision" may include deeming "receiving (for example, receiving information)," "transmitting (for example, transmitting information)," "inputting," "outputting," or "accessing (for example, accessing data in a memory)" as "determining" and/or "deciding." Furthermore, the "determination" and "decision" may include deeming "resolving," "selecting," "choosing," "establishing," or "comparing" as "determining" and/or "deciding." Namely, the "determination" and "decision" may include deeming an operation as "determining" and/or "deciding." Furthermore, "determining" may be replaced with "assuming," "expecting," "considering," or the like.

Terms "connected," "coupled," or variations thereof means any direct or indirect connection or coupling between two or more elements and may include the presence of one or more intermediate elements between two elements which are "connected" or "coupled." The coupling or the connection between the elements may be physical, logical, or a combination thereof. For example, "connection" may be replaced with "access." In a case of using in the present disclosure, two elements may be considered to be "connected" or "coupled" with each other using at least one of one or more electric wires, cables and/or a printed electrical connection or using electromagnetic energy having a wavelength in a radio frequency domain, a microwave region, or a light (both visible and invisible) region as non-limiting and non-exhaustive examples.

A reference signal may be abbreviated as RS and may be referred to as a pilot, depending on a standard to be applied.

A phrase "based on" used in the present disclosure is not limited to "based only on" unless otherwise stated. In other words, a phrase "based on" means both "based only on" and "based on at least."

Any reference to an element using a designation such as "first," "second," or the like used in the present disclosure does not generally restrict quantities or an order of those elements. Such designations can be used in the present disclosure as a convenient method of distinguishing two or more elements. Thus, reference to the first and second elements does not mean that only two elements can be adopted there, or the first element must precede the second element in a certain form.

Furthermore, "means" in the configuration of each of the above devices may be replaced with "unit," "circuit," "device," or the like.

When "include," "including," and variations thereof are used in the present disclosure, these terms are intended to be comprehensive, similar to a term "provided with (comprising)." Further, the term "or" used in the present disclosure is intended not to be an exclusive OR.

A radio frame may include one or more frames in the time domain. In the time domain, each of one or more frames may be referred to as a subframe. The subframe may further include one or more slots in the time domain. The subframe may have a fixed time length (for example, 1 ms) not depending on numerology.

The numerology may be a communication parameter applied to at least one of transmission and reception of a certain signal or channel. For example, the numerology may indicate at least one of a subcarrier spacing (SCS), a bandwidth, a symbol length, a cyclic prefix length, a transmission time interval (TTI), a number of symbols per TTI, a radio frame configuration, a specific filtering process performed in the frequency domain by a transceiver, a specific windowing process performed in the time domain by a transceiver, and the like.

The slot may include one or more symbols (orthogonal frequency division multiplexing (OFDM) symbols, single carrier frequency division multiple access (SC-FDMA) symbols, or the like) in the time domain. The slot may be a time unit based on the numerology.

The slot may include a plurality of mini slots. Each mini slot may include one or more symbols in the time domain. Further, the mini slot may be referred to as a sub-slot. The mini slot may include fewer symbols than a slot. A PDSCH (or PUSCH) transmitted in units of times greater than the mini slot may be referred to as a PDSCH (or PUSCH) mapping type A. A PDSCH (or PUSCH) transmitted using a mini slot may be referred to as a PDSCH (or PUSCH) mapping type B.

All of a radio frame, a subframe, a slot, a mini slot, and a symbol indicates a time unit for transmitting a signal. As a radio frame, a subframe, a slot, a mini slot, and a symbol, different names corresponding to them may be used.

For example, one subframe may be referred to as a transmission time interval (TTI: Transmission Time Interval), or a plurality of consecutive subframes may be referred to as TTIs, or one slot or one mini slot may be referred to as a TTI. In other words, at least one of the subframe and the TTI may be a subframe (1 ms) in the existing LTE, may be a period shorter than 1 ms (for example, 1 to 13 symbols), or may be referred to as a period longer than 1 ms. A unit representing the TTI may be referred to as slot, a mini slot, or the like instead of the subframe.

Here, for example, the TTI refers to a minimum time unit of scheduling in radio communication. For example, in the LTE system, the base station performs scheduling of allocating a radio resource (a frequency bandwidth, a transmission power, or the like which can be used in each terminal 20) to each terminal 20 in units of TTIs. The definition of the TTI is not limited thereto.

The TTI may be a transmission time unit such as a channel coded data packet (transport block), a code block, or a code word, or may be a processing unit such as scheduling or link adaptation. Further, when a TTI is provided, a time interval (for example, the number of symbols) in which a transport block, a code block, a code word, or the like is actually mapped may be shorter than the TTI.

Further, when one slot or one mini slot is referred to as a TTI, one or more TTIs (that is, one or more slots or one or more mini slots) may be a minimum time unit of scheduling. Further, the number of slots (the number of mini slots) forming the minimum time unit of scheduling may be controlled.

A TTI having a time length of 1 ms may be referred to as a common TTI (TTI in LTE Rel. 8 to 12), a normal TTI, a long TTI, a common subframe, a normal subframe, a long subframe, a slot, or the like. A TTI shorter than the common TTI may be referred to as a reduced TTI, a short TTI, a partial TTI (a partial or fractional TTI), a reduced subframe, a short subframe, a mini slot, a sub slot, a slot, or the like.

Furthermore, a long TTI (for example, a normal TTI, a subframe, or the like) may be replaced with a TTI having a time length exceeding 1 ms, and a short TTI (for example, a reduced TTI or the like) may be replaced with a TTI having a TTI length that is less than a TTI length of a long TTI and that is longer than or equal to 1 ms.

The resource block (RB) is a resource allocation unit in the time domain and the frequency domain and may include one or more consecutive subcarriers in the frequency domain. The number of subcarriers included in an RB may be the same irrespective of a numerology and may be, for example, 12. The number of subcarriers included in an RB may be determined based on a numerology.

Furthermore, a time domain of an RB may include one or more symbols and may be a length of one slot, one mini slot, one subframe, or one TTI. One TTI, one subframe, or the like may be formed of one or more resource blocks.

Furthermore, one or more RBs may be referred to as a physical resource block (PRB), a sub carrier group (SCG), a resource element group (REG), a PRB pair, an RB pair, or the like.

Furthermore, the resource block may be formed of one or more resource elements (RE). For example, one RE may be a radio resource region of one subcarrier and one symbol.

A bandwidth part (BWP) (which may be referred to as a partial bandwidth) may indicate a subset of consecutive common resource blocks (RBs) for a certain numerology in a certain carrier. Here, a common RB may be specified by an index of an RB based on a common reference point of a carrier. A PRB may be defined in a BWP and numbered in a BWP.

The BWP may include a BWP for UL (UL BWP) and a BWP for DL (DL BWP). In a UE, one or more BWPs may be configured within one carrier.

At least one of configured BWPs may be active, and the UE need not assume that predetermined signals/channels are transmitted and received outside an active BWP. Furthermore, a "cell," a "carrier," or the like in the present disclosure may be replaced with a "BWP."

Structures of the radio frame, the sub frame, slot, the mini slot, and the symbol are merely examples. For example, configurations such as the number of subframes included in a radio frame, the number of slots per subframe or radio frame, the number of mini slots included in a slot, the number of symbols and RBs included in a slot or a mini slot, the number of subcarriers included in an RB, the number of symbols in a TTI, a symbol length, a cyclic prefix (CP) length, and the like can be variously changed.

In the present disclosure, for example, when an article such as "a," "an," or "the" in English is added by a translation, the present disclosure may include a case in which a noun following the article is the plural.

In the present disclosure, a term "A and B are different" may mean "A and B are different from each other." Furthermore, the term may mean "each of A and B is different from C." Terms such as "separated," "coupled," or the like may also be interpreted similarly to "different."

Each aspect/embodiment described in this specification may be used alone, in combination, or may be switched in accordance with the execution. Furthermore, notification of predetermined information (for example, notification of "being X") is not limited to notification performed explicitly, but may be performed implicitly (for example, not notifying the predetermined information).

Note that, in the present disclosure, a time offset is an example of a parameter for a random access procedure.

Although the present disclosure is described above in detail, it is obvious to those skilled in the art that the present disclosure is not limited to the embodiments described in the present disclosure. The present disclosure may be implemented as revised and modified embodiments without departing from the gist and scope of the present disclosure as set forth in claims. Accordingly, the description of the present disclosure is for the purpose of illustration and does not have any restrictive meaning to the present disclosure.

This international patent application is based on and claims priority to Japanese Patent Application No. 2020-030145 filed on Feb. 26, 2020, and the entire content of Japanese Patent Application No. 2020-030145 is incorporated herein by reference.

LIST OF REFERENCE SYMBOLS 10 base station
110 transmitting unit
120 receiving unit
130 configuration unit
140 control unit
20 terminal
210 transmitting unit
220 receiving unit
230 configuration unit
240 control unit
1001 processor
1002 storage device
1003 auxiliary storage device
1004 communication device
1005 input device
1006 output device

The invention claimed is:
1. A terminal comprising:
a receiver that receives, from a base station, a time domain offset;
a processor that determines a first Physical Uplink Shared Channel (PUSCH) slot used for a transmission; and
a transmitter that transmits a PUSCH to the base station in the determined first PUSCH slot,
wherein a time length of a PUSCH slot is based on a subcarrier spacing of an active Uplink Bandwidth part (UL-BWP), and
wherein a start of the first PUSCH slot is determined by adding the time domain offset to a start of a second PUSCH slot including a Physical Random Access Channel (PRACH) slot.
2. A base station comprising:
a transmitter that transmits, to a terminal, a time domain offset;
a processor that determines a first Physical Uplink Shared Channel (PUSCH) slot used, by the terminal, for a transmission; and
a receiver that receives a PUSCH from the terminal in the determined first PUSCH slot,
wherein a time length of a PUSCH slot is based on a subcarrier spacing of an active Uplink Bandwidth part (UL-BWP), and
wherein a start of the first PUSCH slot is determined by adding the time domain offset to a start of a second PUSCH slot including a Physical Random Access Channel (PRACH) slot.

3. A radio communication system comprising:
a terminal; and
a base station,
wherein the terminal includes:
- a receiver that receives, from a base station, a time domain offset;
- a processor that determines a first Physical Uplink Shared Channel (PUSCH) slot used for a transmission; and
- a transmitter that transmits a PUSCH to the base station in the determined first PUSCH slot,
- wherein a time length of a PUSCH slot is based on a subcarrier spacing of an active Uplink Bandwidth part (UL-BWP), and
- wherein a start of the first PUSCH slot is determined by adding the time domain offset to a start of a second PUSCH slot including a Physical Random Access Channel (PRACH) slot, and wherein the base station includes:
- a transmitter that transmits the time domain offset to the terminal.

4. A communication method executed by a terminal, the method comprising:
receiving, from a base station, a time domain offset;
determining a first Physical Uplink Shared Channel (PUSCH) slot used for a transmission; and
transmitting a PUSCH to the base station in the determined first PUSCH slot
wherein a time length of a PUSCH slot is based on a subcarrier spacing of an active Uplink Bandwidth part (UL-BWP), and
wherein a start of the first PUSCH slot is determined by adding the time domain offset to a start of a second PUSCH slot including a Physical Random Access Channel (PRACH) slot.

* * * * *